(12) United States Patent
Shanmugam et al.

(10) Patent No.: US 11,734,429 B1
(45) Date of Patent: Aug. 22, 2023

(54) SECURE BIOS-ENABLED PASSTHROUGH SYSTEM

(71) Applicant: Dell Products L.P., Round Rock, TX (US)

(72) Inventors: Murali Manohar Shanmugam, Cedar Park, TX (US); Nagaraj Annenavar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/702,934

(22) Filed: Mar. 24, 2022

(51) Int. Cl.
*G06F 21/75* (2013.01)
*G06F 21/57* (2013.01)

(52) U.S. Cl.
CPC .................................. *G06F 21/575* (2013.01)

(58) Field of Classification Search
CPC ...................................................... G06F 21/575
See application file for complete search history.

(56) References Cited

U.S. PATENT DOCUMENTS

| 8,281,116 | B2* | 10/2012 | Rothman | ............... | G06F 9/4401 |
| | | | | | 713/2 |
| 2017/0103208 | A1* | 4/2017 | Bramley, Jr. | ........... | G06F 21/51 |
| 2017/0255194 | A1* | 9/2017 | Poornachandran | ......................... | |
| | | | | | H04W 12/065 |
| 2018/0341774 | A1* | 11/2018 | Yao | .......................... | G06F 21/44 |
| 2019/0303578 | A1* | 10/2019 | Robison | ................ | G06F 21/572 |
| 2020/0134185 | A1* | 4/2020 | Cho | ........................ | G06F 21/602 |
| 2023/0100899 | A1* | 3/2023 | Sayyed | ............... | G06F 11/3075 |
| | | | | | 713/2 |

\* cited by examiner

*Primary Examiner* — Zahid Choudhury
(74) *Attorney, Agent, or Firm* — Joseph Mencher

(57) ABSTRACT

A secure Basic Input/Output System (BIOS)-enabled passthrough system includes a computing device having a computing device component, and a BIOS subsystem in the computing device that is coupled to the computing device component. The BIOS subsystem enables primary access to the computing device component to BIOS drivers. The BIOS subsystem may receive a secondary access session start request from a first BIOS driver to start a secondary access session to use secondary access to the computing device component, it retrieves a first BIOS driver identifier for the first BIOS driver based on the secondary access session start request, determines that the first BIOS driver identifier is a secondary-access-authorized BIOS driver identifier and, in response, begins the first secondary access session and may performs secondary access operation(s) on the computing device component in response to receiving secondary access command(s) from the first BIOS driver during the secondary access session.

20 Claims, 21 Drawing Sheets

US 11,734,429 B1

SECURE BIOS-ENABLED PASSTHROUGH SYSTEM

BACKGROUND

The present disclosure relates generally to information handling systems, and more particularly to securing access to passthrough functionality provided by a Basic Input/Output System (BIOS) in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, utilize a Basic Input/Output System (BIOS) that may be provided by firmware and that may be configured to perform hardware initialization during a boot process (e.g., Power On STart-up (POST)) for the computing device, runtime services for operating systems and applications provided on the computing device, as well as other BIOS functionality known in the art. For example, the Unified Extensible Firmware Interface (UEFI) "BIOS" defines a software interface between operating systems and platform firmware, and replaces the legacy BIOS traditionally utilized in many computing devices (while providing support for legacy BIOS services). Furthermore, the BIOS in a computing device may be configured to provide different functionality to BIOS drivers, which can raise some issues.

For example, for computing devices that include Non-Volatile Memory express (NVMe) storage devices (or that utilize NVMe over Fabrics (NVMe-oF) storage devices), a conventional UEFI BIOS may be configured to provide BIOS drivers block Input/Output (I/O) functionality (e.g., a block I/O level interface for I/O operations) to NVMe storage devices or NVME-oF storage devices (e.g., namespaces in those storage devices), while also providing those BIOS drivers "passthrough" functionality (e.g., by exposing passthrough layer protocols/Application Programming Interfaces (APIs) that allow relatively "low-level/passthrough" control) to those NVMe storage devices or NVME-oF storage devices as well. As will be appreciated by one of skill in the art in possession of the present disclosure, the conventional UEFI BIOS is often configured with the passthrough functionality discussed above by a computing device manufacturer in order to allow computing device manufacturer BIOS drivers (e.g., SoftWare Redundant Array of Independent Disk (SWRAID) drivers and Software Defined Persistent Memory (SDPM) drivers for NVMe storage devices, SMARTFABRIC® Storage Software (SFSS) client drivers for NVME-oF storage devices available from DELL® Inc. of Round Rock, Texas, United States, etc.) relatively "low-level" access to perform administrator commands, security commands, and/or other passthrough access operations known in the art.

However, conventional UEFI BIOS architectures allow global access to the passthrough functionality described above, as the passthrough protocols/APIs are published by the conventional UEFI BIOS and available to both the computing device manufacturer drivers discussed above, as well as add-in card OPtion Read Only Memory (OPROM) UEFI drivers, UEFI shell applications, and a variety of other drivers/applications known in the art. As such, the configuration of conventional UEFI BIOS with the passthrough functionality discussed above introduces security vulnerabilities, as malicious drivers or applications provided on the computing device may utilize that passthrough functionality to delete namespaces in the NVMe/NVME-oF storage devices, send other administrator commands or security commands to the NVMe/NVME-oF storage devices, and/or perform other malicious activities that would be apparent to one of skill in the art in possession of the present disclosure.

Accordingly, it would be desirable to provide a secure BIOS-enabled passthrough system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Basic Input/Output System (BIOS) engine that is configured to: enable, to a plurality of BIOS drivers, primary access to a computing device component; receive, from a first BIOS driver included in the plurality of BIOS drivers, a first secondary access session start request to start a first secondary access session to use secondary access to the computing device component; retrieve, based on the first secondary access session start request, a first BIOS driver identifier for the first BIOS driver; determine that the first BIOS driver identifier is a secondary-access-authorized BIOS driver identifier; begin, in response to determining that the first BIOS driver identifier is a secondary-access-authorized BIOS driver identifier, the first secondary access session; and perform, in response to receiving at least one secondary access command from the first BIOS driver during the first secondary access session, at least one secondary access operation on the computing device component.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
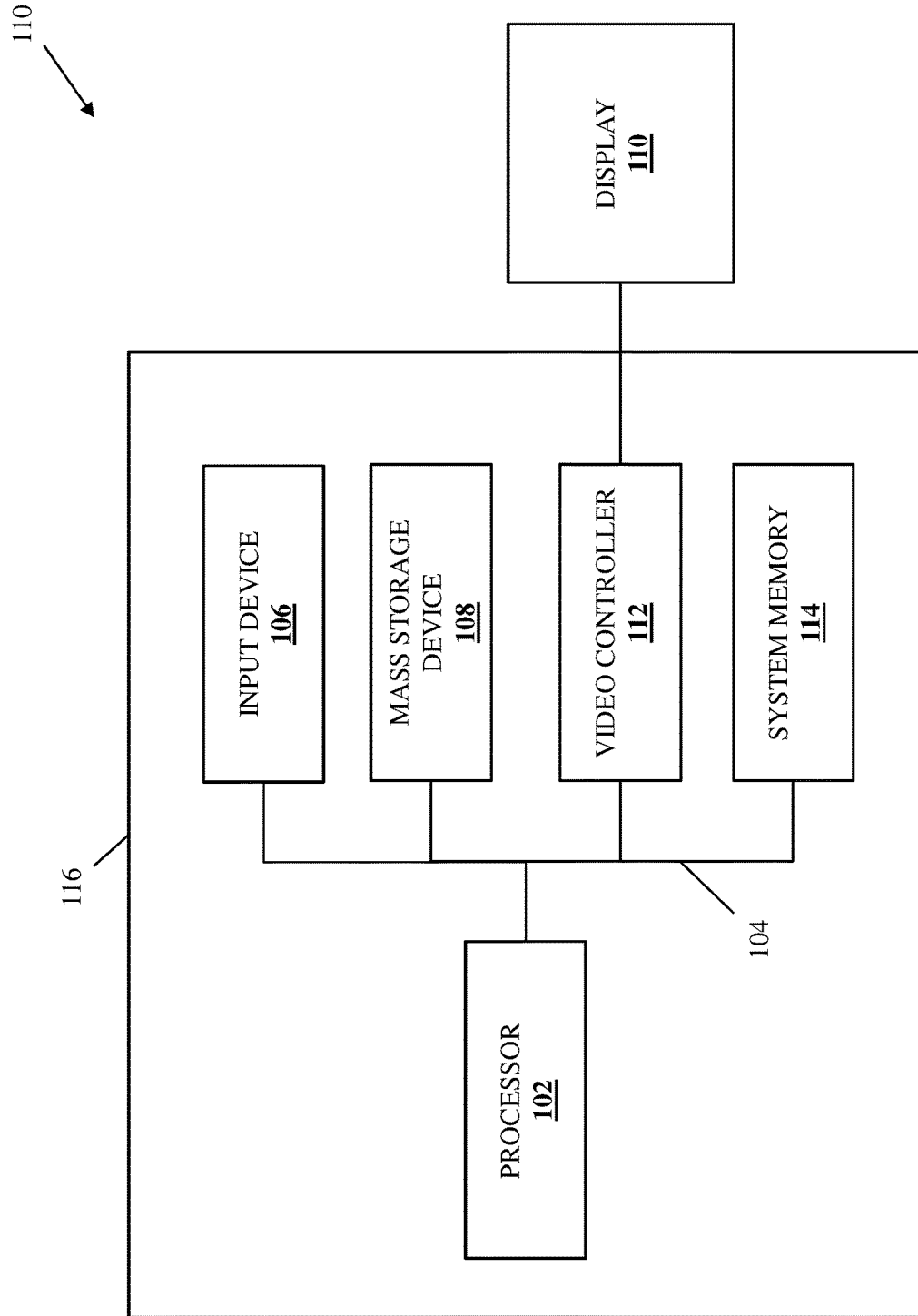
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
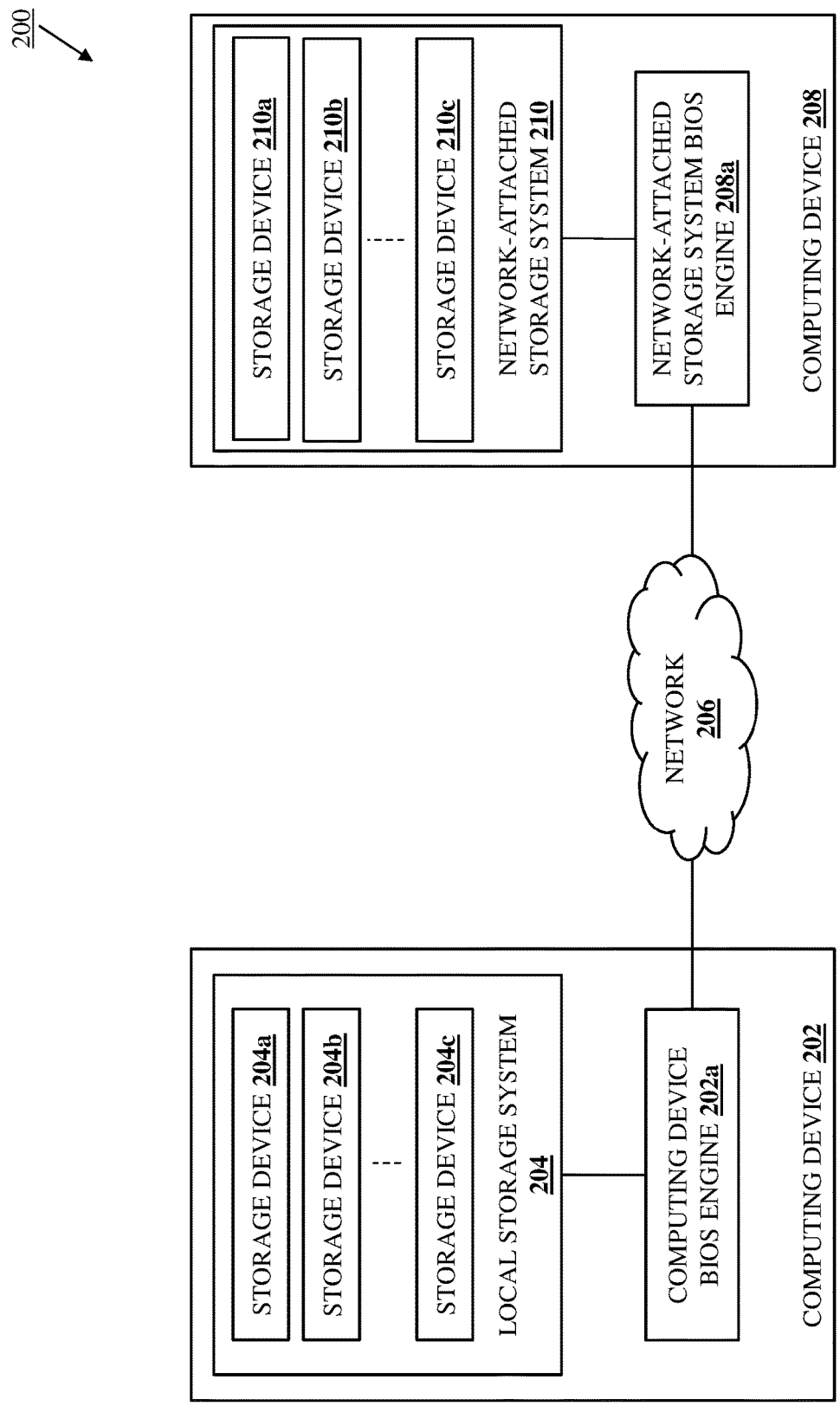
FIG. 2 is a schematic view illustrating an embodiment of a networked system that may provide the secure BIOS-enabled passthrough system of the present disclosure.

Referring now to FIG. 2, an embodiment of a networked system 200 is illustrated that may provide the secure BIOS-enabled passthrough system of the present disclosure. In the illustrated embodiment, the networked system 200 includes a computing device 202. In an embodiment, the computing device 202 may be provided by the IHS 100 discussed above with reference to FIG. 1, and/or may include some or all of the components of the IHS 100, and in the specific examples discussed below is described as being provided by a server device. However, while illustrated and discussed as being provided by a server device, one of skill in the art in possession of the present disclosure will recognize that computing devices provided in the networked system 200 may include any devices that may be configured to operate similarly as the computing device 202 discussed below. As discussed in further detail below, the computing device 202 may include a computing device BIOS engine 202a that may be provided by a processing system and a memory system that is coupled to the processing system and that includes instructions that, when executed by the processing system, configure the processing system to perform the functionality of the computing device BIOS engines, computing device BIOS subsystems, and/or computing devices discussed below.

In an embodiment, the computing device 202 also includes computing device components that are coupled to the computing device BIOS engine 202a(e.g., via a coupling between computing device components and the processing system), which are illustrated in FIG. 2 as being provided by storage devices 204a, 204b, and up to 204c that are included in a local storage system 204, and that are described below as being provided by Non-Volatile Memory express (NVMe) storage devices. However, while illustrated as being provided by particular storage devices, one of skill in the art in possession of the present disclosure will appreciate how the storage devices 204a-204c described herein may be replaced by a variety of computing device components while remaining within the scope of the present disclosure as well. In the illustrated embodiment, the computing device BIOS engine 202a in the computing device 202 is coupled to a network 206 that may be provided by a Local Area Network (LAN), the Internet, combinations thereof, and/or any of a variety of other networks that would be apparent to one of skill in the art in possession of the present disclosure.

In the illustrated embodiment, a computing device 208 is coupled to the computing device 202 via the network 206. In an embodiment, the computing device 208 may be provided by the IHS 100 discussed above with reference to FIG. 1, and/or may include some or all of the components of the IHS 100, and in the specific examples discussed below is described as being provided by a server device. However, while illustrated and discussed as being provided by a server device, one of skill in the art in possession of the present disclosure will recognize that computing devices provided in the networked system 200 may include any devices that may be configured to operate similarly as the computing device 208 discussed below. As discussed in further detail below, the computing device 208 may include a network-attached storage system BIOS engine 208a that may be provided by a processing system and a memory system that is coupled to the processing system and that includes instructions that, when executed by the processing system, configure the processing system to perform the functionality of the network-attached storage system BIOS engines, network-attached storage system BIOS subsystems, and/or computing devices discussed below.

In an embodiment, the computing device 208 also includes computing device components that are coupled to the network-attached storage system BIOS engine 208a (e.g., via a coupling between computing device components and the processing system), which are illustrated in FIG. 2 as being provided by storage devices 210a, 210b, and up to 210c that are included in a network-attached storage system 210, and that are described below as being provided by NVMe over Fabric (NVMe-oF) storage devices. However, while illustrated as being provided by particular storage devices, one of skill in the art in possession of the present disclosure will appreciate how the storage devices 210a-210c described herein may be replaced by a variety of computing device components while remaining within the scope of the present disclosure as well.

In the specific examples provided below, the computing device BIOS engine 202a provides the secure BIOS-enabled passthrough access to the storage devices 204a-204c (e.g., NVMe storage devices) in the local storage system 204 for BIOS drivers it provides, while the network-attached storage system BIOS engine 208a provides the secure BIOS-enabled passthrough access to the storage devices 210a-210c (e.g., NVMe-oF storage devices) in the network-attached storage system 210 for BIOS drivers provided by the computing device BIOS engine 202a. As such, one of skill in the art in possession of the present disclosure will appreciate how the terms "local" and "network-attached" utilized with reference to FIG. 2 are from the perspective of the computing device 202, with the computing device BIOS engine 202a providing BIOS drivers that may access its "local" storage devices 204a-204b and/or access the "network-attached" storage devices 210a-210c via the network 206. However, while a specific networked system 200 has been illustrated and described, one of skill in the art in possession of the present disclosure will recognize that the secure BIOS-enabled passthrough system of the present disclosure may include a variety of components and component configurations while remaining within the scope of the present disclosure as well.

Figure 3:
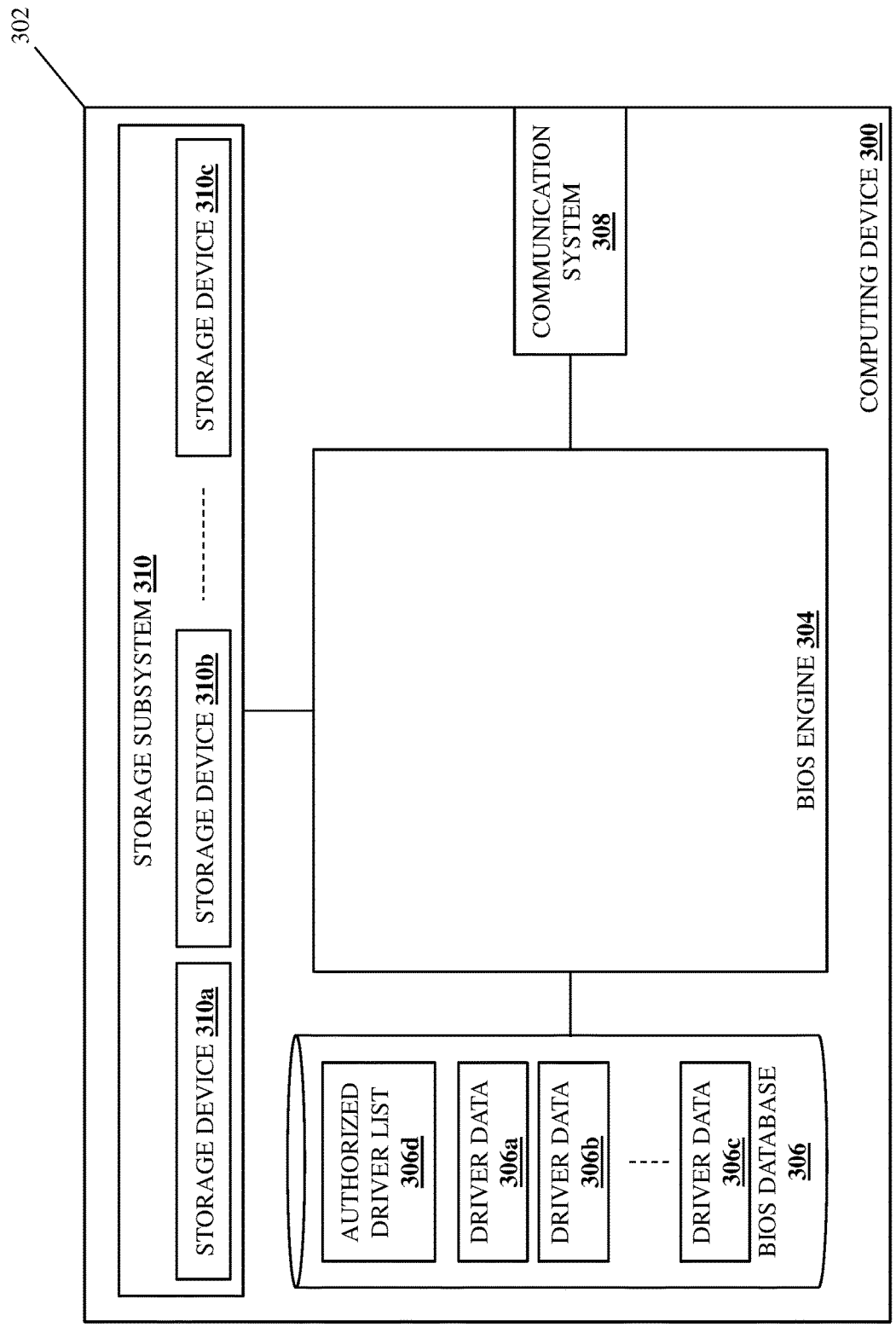
FIG. 3 is a schematic view illustrating an embodiment of a computing device that may be included in the networked system of FIG. 2 and that may provide the secure BIOS-enabled passthrough system of the present disclosure.

Referring now to FIG. 3, an embodiment of a computing device 300 is illustrated that may provide either of the computing devices 202 and/or 208 discussed above with reference to FIG. 2. As such, the computing device 300 may be provided by the IHS 100 discussed above with reference to FIG. 1 and/or may include some or all of the components of the IHS 100, and in the specific examples below is described as being provided by a server device. Furthermore, while illustrated and discussed as being provided by a server device, one of skill in the art in possession of the present disclosure will recognize that the functionality of the computing device 300 discussed below may be provided by other devices that are configured to operate similarly as the computing device 300 discussed below. In the illustrated embodiment, the computing device 300 includes a chassis 302 that houses the components of the computing device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a Basic Input/Output System (BIOS) engine 304 that is configured to perform the functionality of the BIOS engines and/or computing devices discussed below.

The chassis 302 may also house a storage system (not illustrated, but which may include the storage 108 discussed above with reference to FIG. 1) that is coupled to the BIOS engine 304 (e.g., via a coupling between the storage system and the processing system) and that includes a BIOS database 306 that is configured to store any of the information utilized by the BIOS engine 304 discussed below. In the specific examples provided herein, the BIOS database 306 stores a plurality of driver data 306a, 306b, and up to 306c, which is discussed below as being utilized by the BIOS engine 304 to provide BIOS drivers, as well as the primary/block I/O access and secondary passthrough access to the computing device components discussed below. Furthermore, the BIOS database 306 also stores an authorized driver list 306d that is discussed below as identifying BIOS drivers that are authorized to have the passthrough access provided by the BIOS engine 304. However, while particular contents of the BIOS database 306 are illustrated and discussed below, one of skill in the art in possession of the present disclosure will appreciate that the BIOS database 306 may store any data required to provide the functionality discussed below while remaining within the scope of the present disclosure as well.

The chassis 302 may also house a communication system 308 that is coupled to the BIOS engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. The chassis 302 also houses computing device components that, in the illustrated example, are provided by a plurality of storage devices 310a, 310b, and 310c that are included in a storage subsystem 310. Similarly as discussed above, the storage devices 310a-310c are described below as being provided by NVMe storage devices or NVMe-oF storage devices, but one of skill in the art in possession of the present disclosure will appreciate how other computing device components will fall within the scope of the present disclosure as well. As such, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
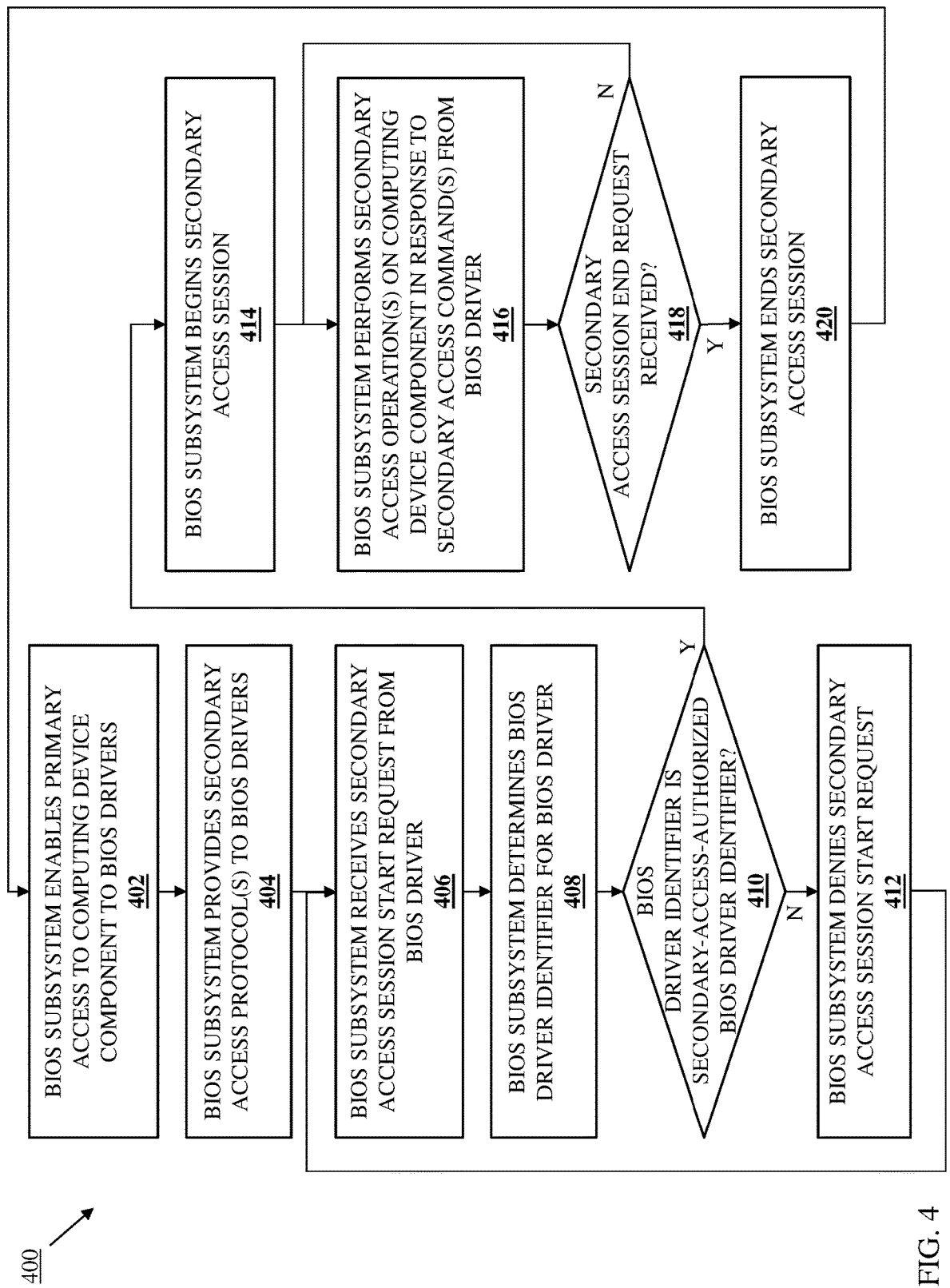
FIG. 4 is a flow chart illustrating an embodiment of a method for providing secure BIOS-enabled passthrough access.

Referring now to FIG. 4, an embodiment of a method 400 for providing secure BIOS-enabled passthrough access is illustrated. As discussed below, the systems and methods of the present disclosure provide for the secure use of secondary BIOS-enabled passthrough access to computing device components via the identification of BIOS drivers that request such secondary BIOS-enabled passthrough access, and only granting that secondary BIOS-enabled passthrough access to BIOS drivers that are authorized for that secondary BIOS-enabled passthrough access. For example, the secure BIOS-enabled passthrough system of the present disclosure may include a computing device having a computing device component, and a BIOS subsystem in the computing device that is coupled to the computing device component. The BIOS subsystem enables primary access to the computing device component to BIOS drivers. The BIOS subsystem may receive a secondary access session start request from a first BIOS driver to start a secondary access session to use secondary access to the computing device component, it retrieves a first BIOS driver identifier for the first BIOS driver based on the secondary access session start request, determines that the first BIOS driver identifier is a secondary-access-authorized BIOS driver identifier and, in response, begins the first secondary access session and may performs secondary access operation(s) on the computing device component in response to receiving secondary access command(s) from the first BIOS driver during the secondary access session. As such, secondary BIOS-enabled passthrough access that allows the performance of administrator commands, security commands, and/or other relatively "low-level"/passthrough access commands on computing device components is secured.

Figure 5:
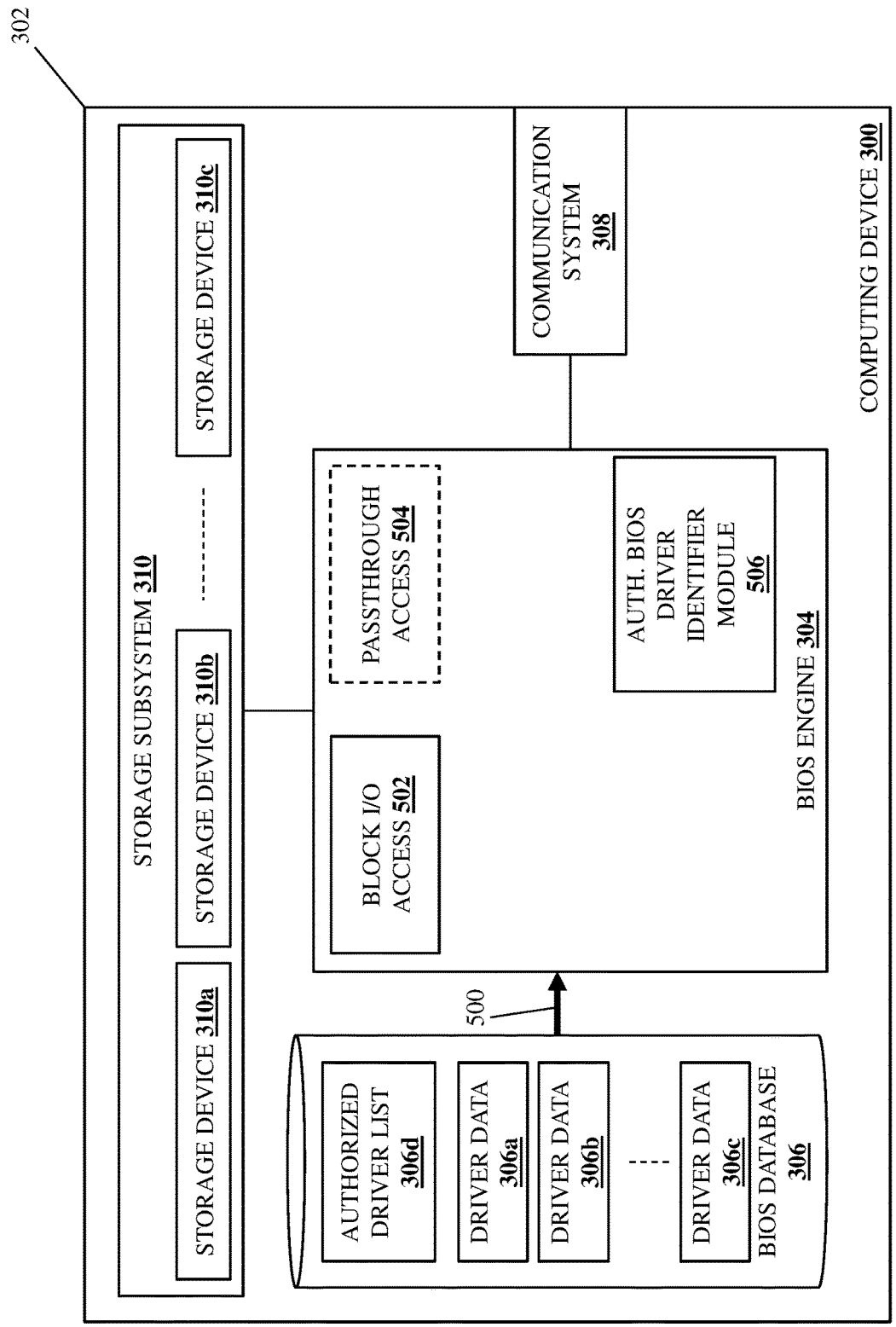
FIG. 5 is a schematic view illustrating an embodiment of the computing device of FIG. 3 operating during the method of FIG. 4.

The method 400 begins at block 402 where a BIOS subsystem enables primary access to a computing device component to BIOS drivers. With reference to FIG. 5, in an embodiment of block 402 and in response to powering on, resetting, or otherwise initializing the computing device 300, the BIOS engine 304 may perform computing device component access configuration operations 500 that include utilizing information in the BIOS database 306 to configure primary/block Input/Output (I/O) access 502 and secondary/ passthrough access 504 to any or all of the storage devices 310a-310c in the storage subsystem 310. For example, as will be appreciated by one of skill in the art in possession of the present disclosure, the computing device component access configuration operations 500 may include the BIOS engine 304 utilizing any of the driver data 306a-306c to provide a UEFI driver that configures the primary/block I/O access 502, which may be enabled by the UEFI driver publishing, exposing, or otherwise providing primary/block I/O protocol(s) (e.g., Application Programming Interface(s) (API(s)) for the storage devices 310a-310c (e.g., the namespaces in those storage devices 310a-310c). As will be appreciated by one of skill in the art in possession of the present disclosure, the primary/block I/O protocol(s) may be used by any BIOS drivers to generate and transmit primary/block I/O commands that cause the BIOS engine 308 to perform primary/block I/O operations with any or all of the storage devices 310a-310c in the storage subsystem 310 (e.g., the namespaces in those storage devices 310a-310c).

As will be appreciated by one of skill in the art in possession of the present disclosure, some embodiments of block 402 may be performed by the computing device BIOS engine 202a in the computing device 202 using an NVMe UEFI driver to configure the primary/block I/O access 502 to any or all of the storage devices 204a-204c provided by NVMe storage devices, as well as to provide the primary/block I/O protocol for the storage devices 204a-204c (e.g., the namespaces in the storage devices 204a-204c), while other embodiments of block 402 may be performed by the network-attached storage system BIOS engine 208a in the computing device 208 using an NVMe-oF UEFI driver to configure the primary/block I/O access 502 to any or all of the storage devices 210a-210c provided by NVMe-oF storage devices, as well as to provide the primary/block I/O protocol for the storage devices 204a-204c (e.g., the namespaces in the storage devices 204a-204c). Furthermore, one of skill in the art in possession of the present disclosure will recognize that, in such embodiments, the primary/block I/O protocol published as discussed above may be utilized by any BIOS driver to generate and transmit primary/block I/O commands that cause the BIOS engine 304 to perform primary/block I/O operations on the storage devices 310a-310c.

Figure 6:
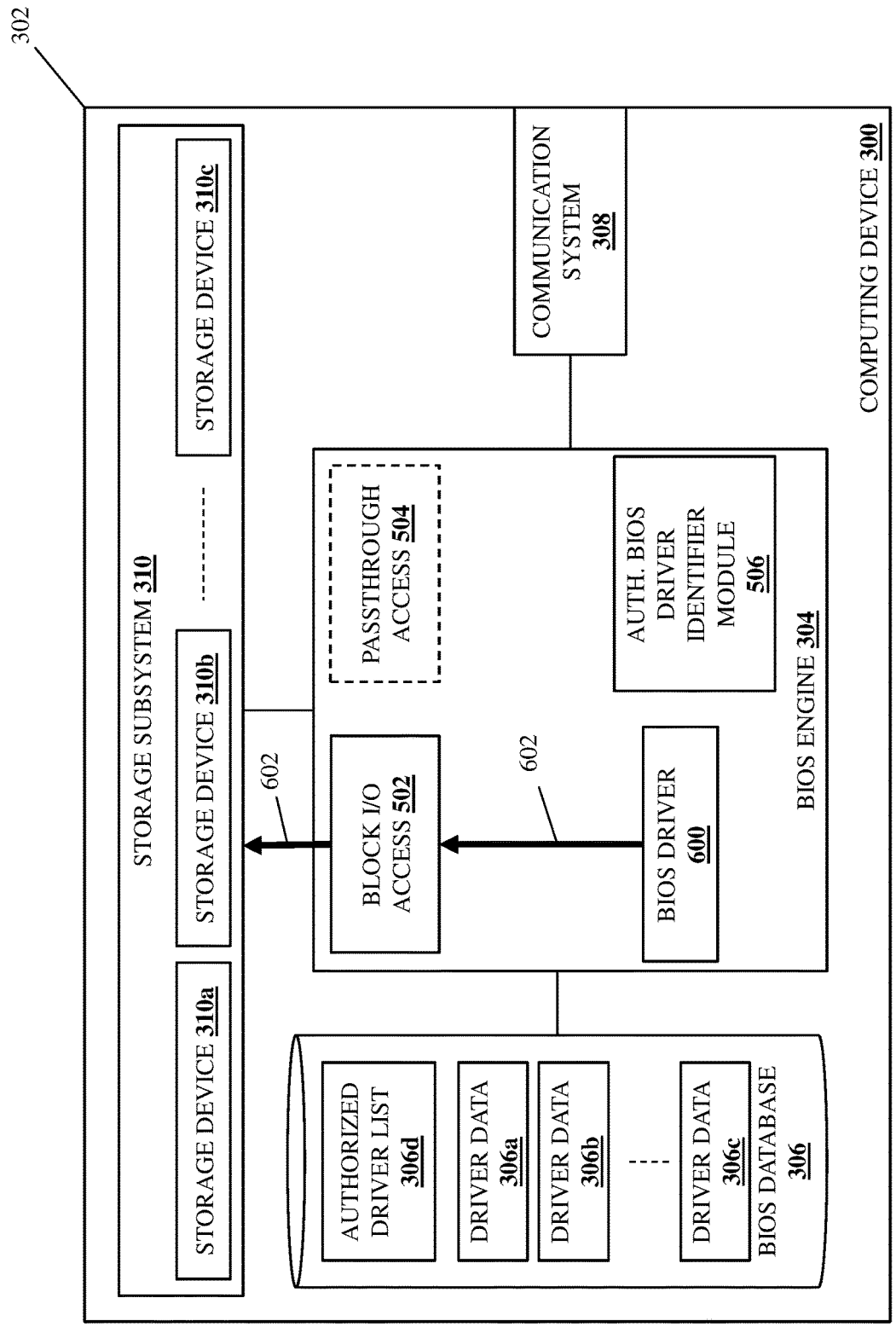
FIG. 6 is a schematic view illustrating an embodiment of the computing device of FIG. 3 operating during the method of FIG. 4.
Figure 7A:
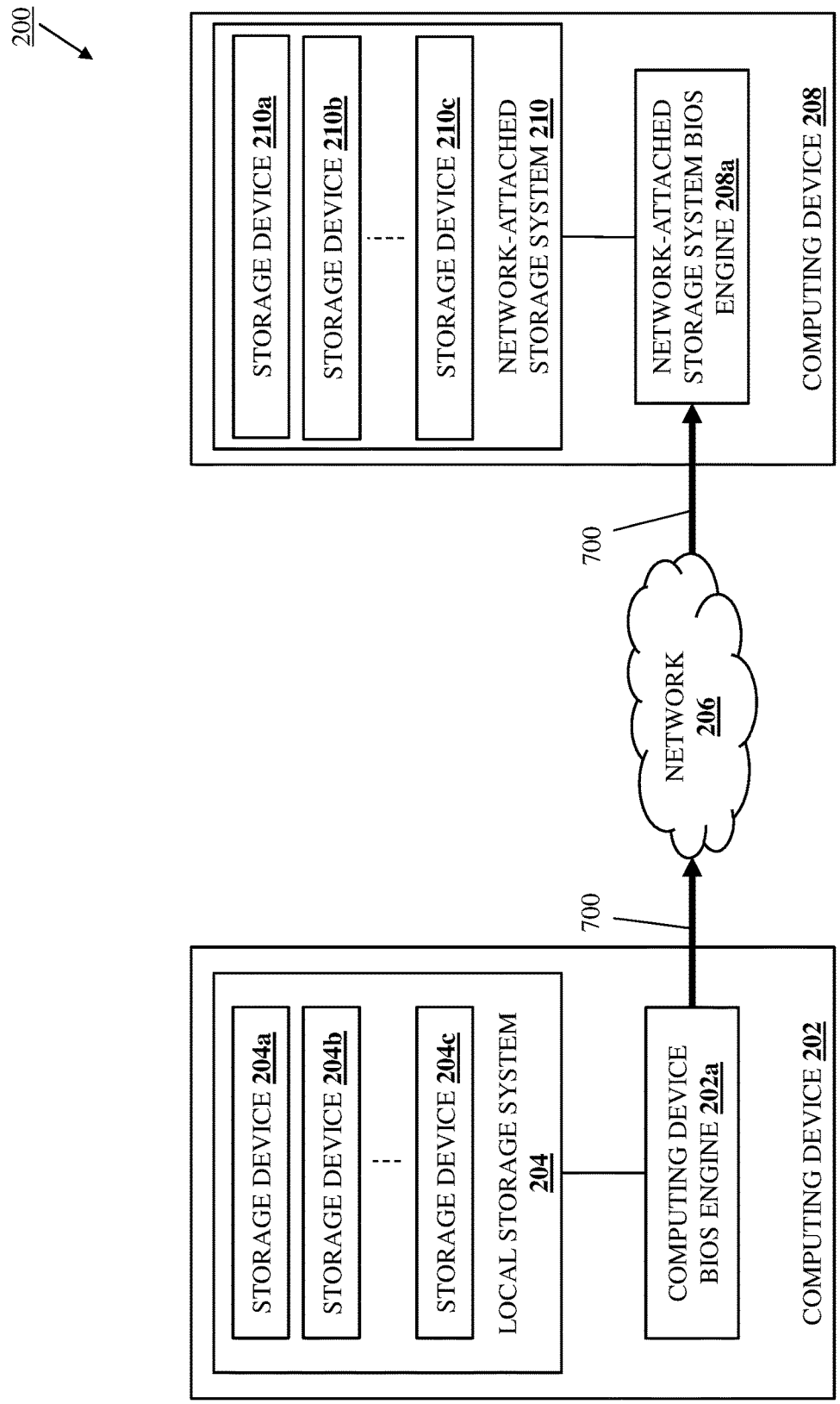
FIG. 7A is a schematic view illustrating an embodiment of the networked system of FIG. 2 operating during the method of FIG. 4.
Figure 7B:
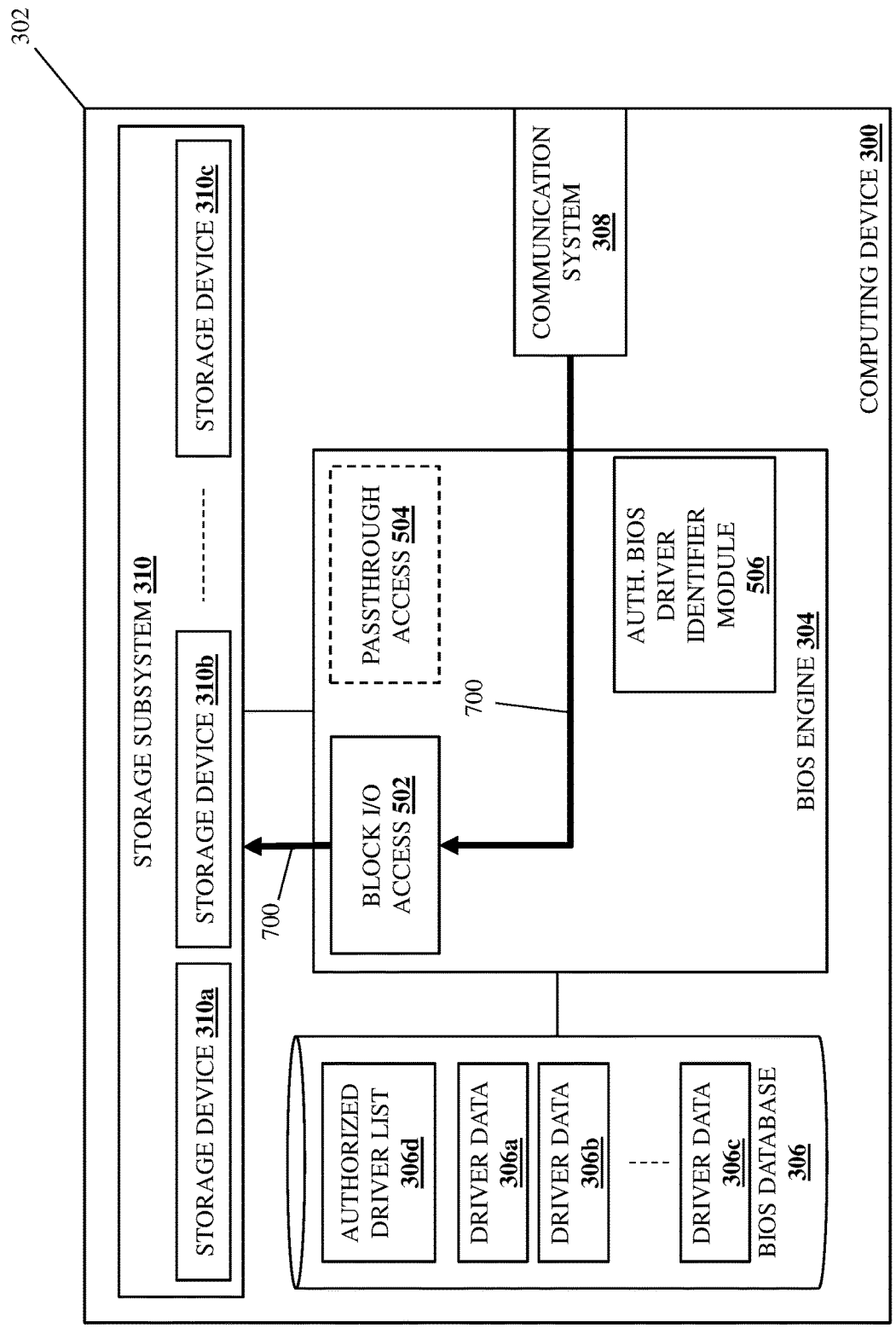
FIG. 7B is a schematic view illustrating an embodiment of the computing device of FIG. 3 operating during the method of FIG. 4.

In an example of local storage device primary/block I/O access, with reference to FIGS. 2 and 6, the BIOS engine 202a/304 in the computing device 202/300 may utilize any of the driver data 306a-306c to provide a BIOS driver 600 (i.e., by loading that BIOS driver 600 in the memory system of the computing device 202/300), and may then utilize the BIOS driver 600 to perform primary/block I/O access operations 602 that may include the BIOS driver 600 using the primary/block I/O protocol(s) to generate and transmit a primary/block I/O command to the BIOS engine 202a/304 that cause the BIOS engine 202a/304 to perform a primary/block I/O operation on the storage device 204b/310b (e.g., an NVMe storage device in this example). In an example of network-attached storage device primary/block I/O access, with reference to FIGS. 7A and 7B, the BIOS engine 202a/304 in the computing device 202/300 may utilize any of the driver data 306a-306c to provide a BIOS driver (e.g., similar to the BIOS driver 600 discussed above with reference to FIG. 6), and may then utilize the BIOS driver to perform primary/block I/O access operations 700 that may include the BIOS driver using the primary/block I/O protocol(s) to generate and transmit a primary/block I/O command via the network 206 (using the communication systems 308 in the computing devices 202/300 and 208/300) to the BIOS engine 208a/304 that causes the BIOS engine 208a/304 to perform a primary/block I/O operation on the storage device 210b/310b (an NVMe-oF storage device in this example). However, while the primary access enabled at block 402 has been described as block I/O access to storage devices, one of skill in the art in possession of the present disclosure will appreciate how other primary access to other computing device components will fall within the scope of the present disclosure as well.

The method 400 then proceeds to block 404 where the BIOS subsystem provides secondary access protocol(s) to the BIOS drivers. With continued reference to FIG. 5, the computing device component access configuration operations 500 discussed above may also include the BIOS engine 304 utilizing any of the driver data 306a-306c to provide a UEFI driver that configures the secondary/passthrough access 504, which may be enabled by the UEFI driver publishing, exposing, or otherwise providing secondary/passthrough protocol(s) (e.g., API(s)) for the storage devices 310a-310c. As will be appreciated by one of skill in the art in possession of the present disclosure, the secondary/passthrough protocol(s) may be used by BIOS drivers to generate and transmit secondary/passthrough access commands to the BIOS engine 308 that may include administrator commands, security commands, and/or other passthrough access commands associated with secondary/passthrough operations that may be performed with any or all of the storage devices 310a-310c in the storage subsystem 310.

As will be appreciated by one of skill in the art in possession of the present disclosure, some embodiments of block 402 may be performed by the computing device BIOS engine 202a in the computing device 202 using an NVMe UEFI driver to configure the secondary/passthrough access 504 to any or all of the storage devices 204a-204c provided by NVMe storage devices, as well as provide the secondary/passthrough protocol(s) for the storage devices 204a-204c, while other embodiments of block 402 may be performed by the network-attached storage system BIOS engine 208a in the computing device 208 using an NVMe-oF UEFI driver to configure the secondary/passthrough access 504 to any or all of the storage devices 210a-210c provided by NVMe-oF storage devices, as well as provide the secondary/passthrough protocol(s) for the storage devices 204a-204c.

However, in contrast to the primary/block I/O access 502 that may be used by any BIOS driver, FIG. 5 illustrates how the secondary/passthrough access 504 configured at block 402 is not available to all BIOS driver (as indicated by the dashed lines used illustrate the secondary/passthrough access 504). In an embodiment, the BIOS engine 304 may include an authenticated BIOS driver identifier module 506 that, as discussed in further detail below, is configured to enable/disable the passthrough access 504 for BIOS drivers depending on whether they are authenticated BIOS drivers for which the secondary/passthrough access 504 is allowed. As such, at block 402, the computing device component access configuration operations 500 may also include the BIOS engine 304 utilizing any of the driver data 306a-306c to provide a UEFI driver that operates to provide the authenticated BIOS driver identifier module 506, and that UEFI driver may operate to publish, expose, or otherwise provide secondary/passthrough access authentication protocol(s) (e.g., API(s)) for the passthrough access 504 to the storage devices 310a-310c. As discussed in further detail below, the secondary/passthrough access authentication protocol(s) may be used by BIOS drivers to request secondary/passthrough access sessions during which they may utilize the secondary/passthrough access 504 to any or all of the storage devices 310a-310c in the storage subsystem 310.

Figure 8A:
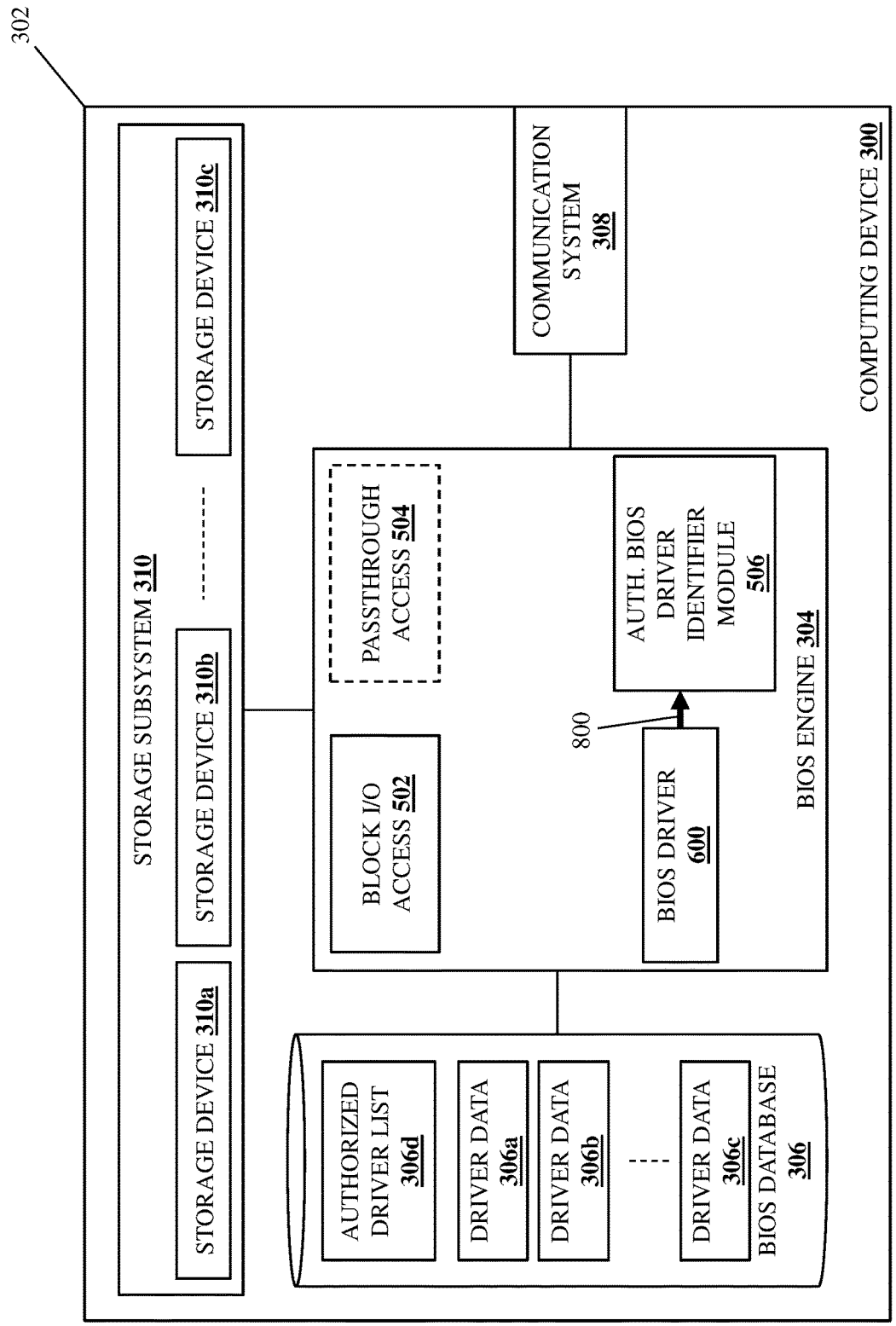
FIG. 8A is a schematic view illustrating an embodiment of the computing device of FIG. 3 operating during the method of FIG. 4.
Figure 9A:
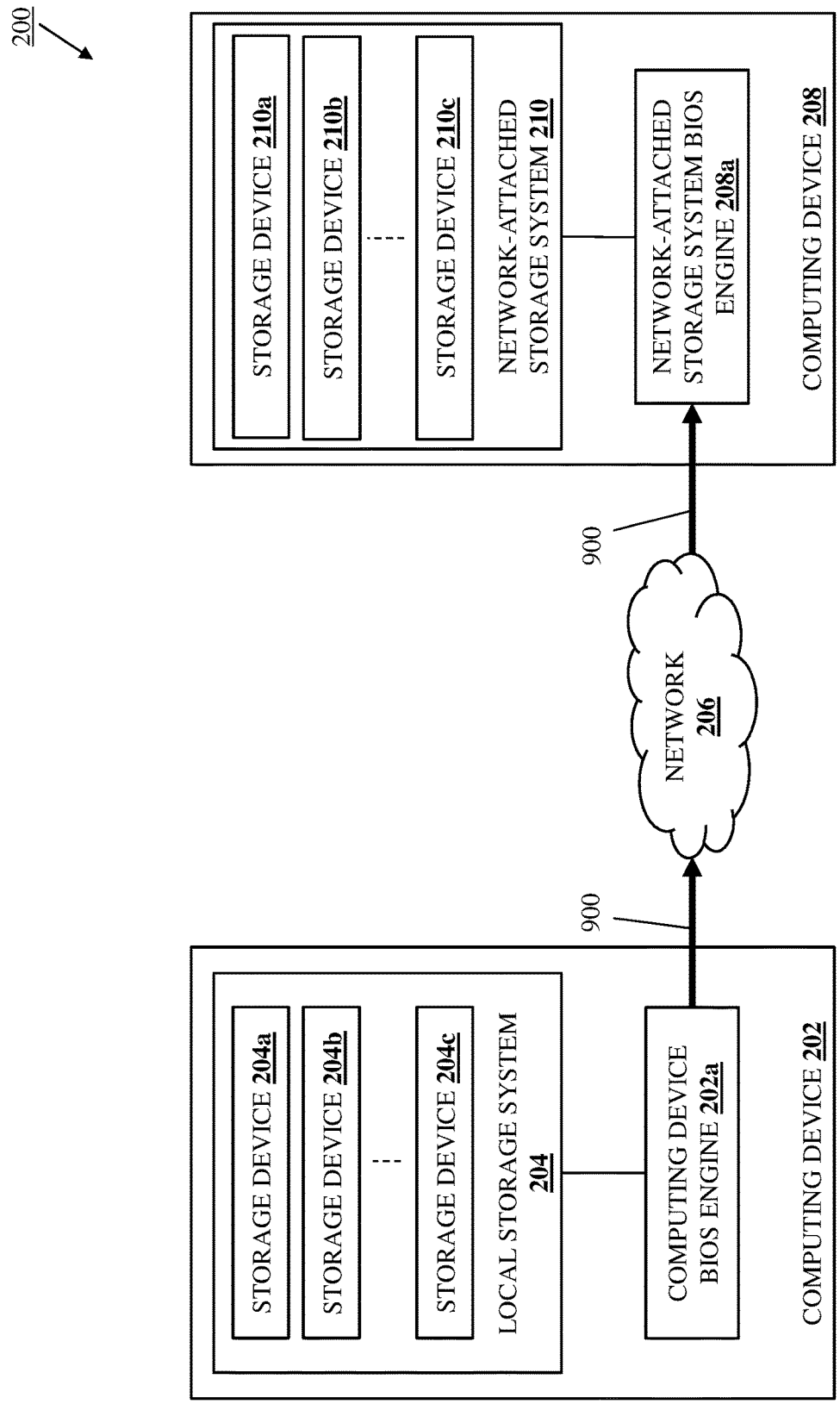
FIG. 9A is a schematic view illustrating an embodiment of the networked system of FIG. 2 operating during the method of FIG. 4.
Figure 9B:
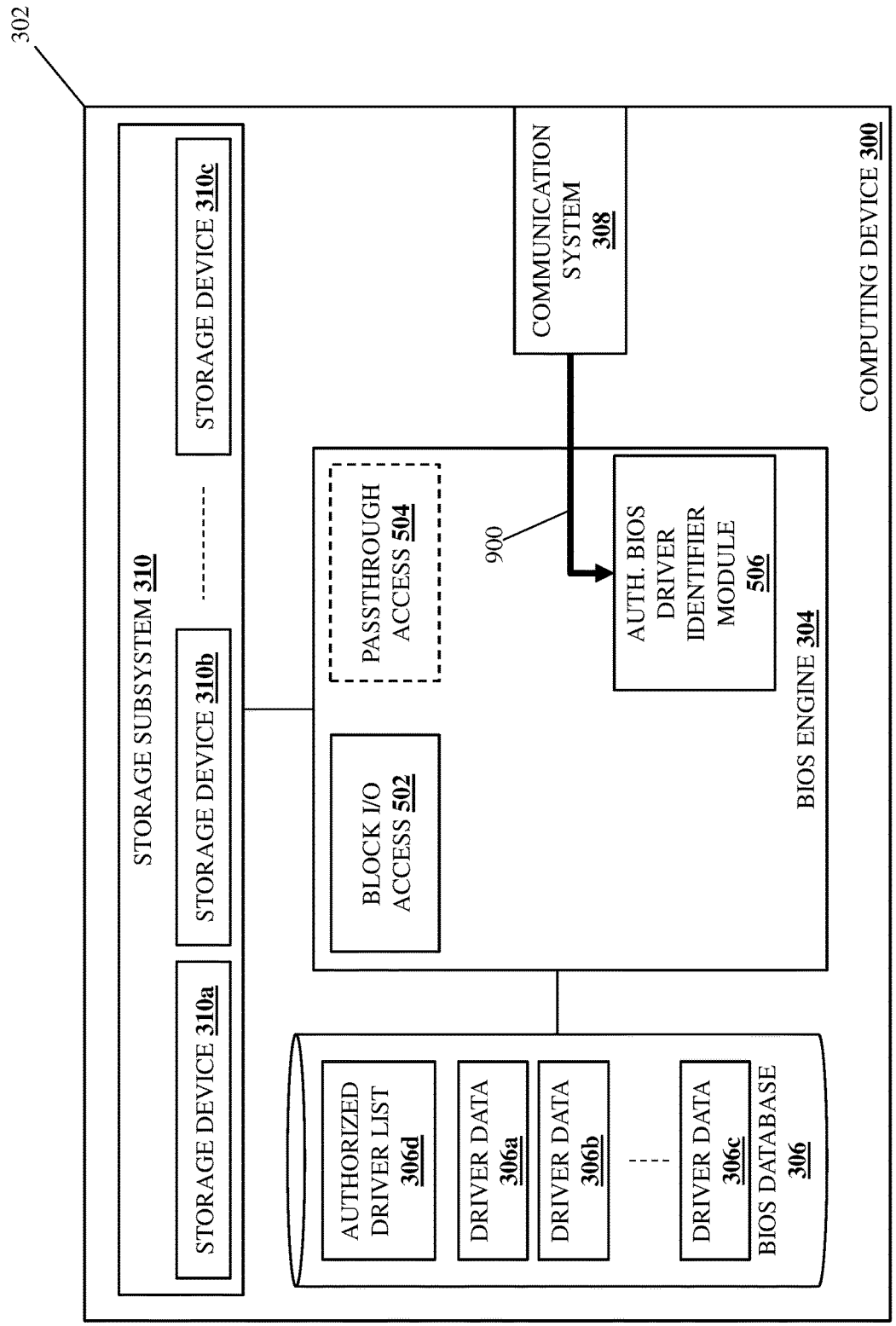
FIG. 9B is a schematic view illustrating an embodiment of the computing device of FIG. 3 operating during the method of FIG. 4.

The method 400 then proceeds to block 406 where the BIOS subsystem receives a secondary access session start request from a BIOS driver. With reference to FIG. 8A, in an embodiment of block 406 in which local storage device secondary/passthrough access is being requested, the BIOS driver 600 provided by the BIOS engine 202a/304 of the computing device 202/300 may perform secondary access session start request operations 800 that include using the secondary/passsthrough access authentication protocol(s) (e.g., a "StartAuthenticatedSession" API) to generate and transmit a secondary access session start request to the authenticated BIOS driver identifier module 506 in the BIOS engine 202a/300 of the computing device 202/300. With reference to FIGS. 9A and 9B, in an embodiment of block 406 in which network-attached storage device secondary/passthrough access is being requested, the BIOS driver (e.g., similar to the BIOS driver 600 discussed above with reference to FIG. 8A) provided by the BIOS engine 202a/304 of the computing device 202/300 may perform secondary access session start request operations 900 that include using the secondary/passthrough access authentication protocol(s) (e.g., a "StartAuthenticatedSession" API) to generate and transmit a secondary access session start request via the network 206 (using the communication systems 308 in the computing devices 202/300 and 208/300) to the authenticated BIOS driver identifier module 506 in the BIOS engine 208a/304 of the computing device 208/300. As will be appreciated by one of skill in the art in possession of the present disclosure, the secondary access session start request may be provided by a simple "call" that does not include passwords, credentials, or other authentication information.

The method 400 then proceeds to block 408 where the BIOS subsystem determines a BIOS driver identifier for the BIOS driver. In an embodiment, at block 408 and in response to receiving the secondary access session start request, the authenticated BIOS driver identifier module 506 may operate to perform BIOS driver identification operations, and one of skill in the art in possession of the present disclosure will appreciate how the BIOS driver identification operations performed by the authenticated BIOS driver identifier module 506 will be the same in either of the local storage device secondary/passthrough access request scenarios or network-attached storage device secondary/passthrough access request scenarios provided in the examples above.

As will be appreciated by one of skill in the art in possession of the present disclosure, the generation and transmission of the secondary access session start request at block 406 may be accompanied by the generation of a "call stack" that may begin with the secondary access session start request generated and transmitted by the BIOS driver, and may include a series of calls/functions (which may be based on how sub-functions are organized) that ends with a final call/function that will satisfy the secondary access session start request (e.g., beginning a secondary access session in this example). As such, the call stack generated in response to the secondary access session start request may include a first call having first instruction pointer associated with a first function, a second call having a second instruction pointer associated with second function, and up to an Nth call having an Nth instruction pointer associated with an Nth function. Furthermore, each call in the call stack will also identify a memory location that stores the portion of the driver that performs its function (e.g., the first call in the example above will identify a memory location of the portion of the BIOS driver that generated/transmitted the secondary access session start request).

In an embodiment, at block 408, authenticated BIOS driver identifier module 506 may "walk the call stack" generated in response to the secondary access session start request by finding the first instruction pointer that begins the first call in that call stack, and determining the memory location in that first call that identifies the portion of the BIOS driver that generated/transmitted the secondary access session start request. The BIOS driver identifier module 506 may then access the memory system of the computing device 300 and find the memory location from the first call. As discussed above, the BIOS driver will have been loaded in the memory system of the computing device 300, and thus the memory location from the first call will allow the authenticated BIOS driver identifier module 506 to identify the location in the memory system that stores the portion of the BIOS driver that generated/transmitted the secondary access session start request.

In an embodiment, at block 408, the authenticated BIOS driver identifier module 506 may then search the memory system in the computing device 300 based on the memory location from the first call for a BIOS driver identifier of the BIOS driver that generated/transmitted the secondary access session start request. For example, the searching of the memory system in the computing device 300 based on the memory location from the first call for the BIOS driver identifier may include identifying a memory system alignment point in the memory system that is adjacent the memory location from the first call. As will be appreciated by one of skill in the art in possession of the present disclosure, many memory systems utilize 4K memory system alignment points for the installation of BIOS drivers (i.e., with each BIOS driver installed beginning at one of the 4K memory system alignment points), and thus the authenticated BIOS driver identifier module 506 may find the "nearest" 4K memory system alignment point to the memory location from the first call. To provide a specific example, if the memory location from the first call is 9300, then the authenticated BIOS driver identifier module 506 may find the memory location 8000, which one of skill in the art in possession of the present disclosure will recognize is the nearest 4K memory system alignment point to memory location 9300.

In an embodiment, at block 408 and in response to identifying the memory system alignment point adjacent the memory location from the first call, the authenticated BIOS driver identifier module 506 may determine whether a BIOS driver signature is located adjacent the memory system alignment point. As will be appreciated by one of skill in the art in possession of the present disclosure, in the event the BIOS driver was loaded in the memory system at the memory system alignment point, a BIOS driver signature such as an EFI image base address will be present. Furthermore, one of skill in the art in possession of the present disclosure will recognize that an EFI image base address may begin with an "M" as the first byte and a "Z" as the second byte, and thus the authenticated BIOS driver identifier module 506 may determine whether the BIOS driver was loaded in the memory system at the memory system alignment point by determining whether the "M" first byte and "Z" second byte of an EFI image base address is present at or near the memory system alignment point.

As will be appreciated by one of skill in the art in possession of the present disclosure, in the event the BIOS driver signature is not located adjacent the memory system alignment point (e.g., there is no "M" first byte and "Z" second byte of an EFI image base address present at or near the memory system alignment point), the authenticated BIOS driver identifier module 506 may find the "next-nearest" memory system alignment point to the memory location from the first call, determine whether a BIOS driver signature is located adjacent that next-nearest memory system alignment point, and iterate that process until a BIOS driver signature is found. To continue with the specific example above in which the memory location was 9300, in the event the authenticated BIOS driver identifier module 506 determines that no BIOS driver signature is located at or near the memory location 8000 that provides the nearest 4K memory system alignment point to memory location 9300, the authenticated BIOS driver identifier module 506 may find the memory location 4000, which one of skill in the art in possession of the present disclosure will recognize is the next-nearest 4K memory system alignment point to memory location 9300.

In an embodiment and in response to determining that the BIOS driver signature is located adjacent the memory system alignment point (e.g., there is an "M" first byte and "Z" second byte of an EFI image base address present at or near the memory system alignment point), the authenticated BIOS driver identifier module 506 may identify the BIOS driver identifier for the BIOS adjacent the BIOS driver signature. As will be appreciated by one of skill in the art in possession of the present disclosure, the BIOS driver signature (e.g., the EFI image base address) may be followed by an BIOS driver identifier that may be included in a header (e.g., in a directory of "EFI_IMAGE_OPTIONAL_HEADER64" in an image header) that identifies a Module Name String for the BIOS driver (e.g., "Sdpm.efi", "S160.efi", "NVMeofStfsClient.efi", etc.) that generated/transmitted the secondary access session start request, a hash value (e.g., an image hash) generated by performing hashing operations on the BIOS driver that generated/transmitted the secondary access session start request, and/or other BIOS driver identifiers that would be apparent to one of skill in the art in possession of the present disclosure. However, while a specific technique for determining the BIOS driver identifier for the BIOS driver that generated/transmitted the secondary access session start request has been described, one of skill in the art in possession of the present disclosure will recognize that other techniques for determining BIOS driver identifiers may be utilized while remaining within the scope of the present disclosure as well.

Figure 8B:
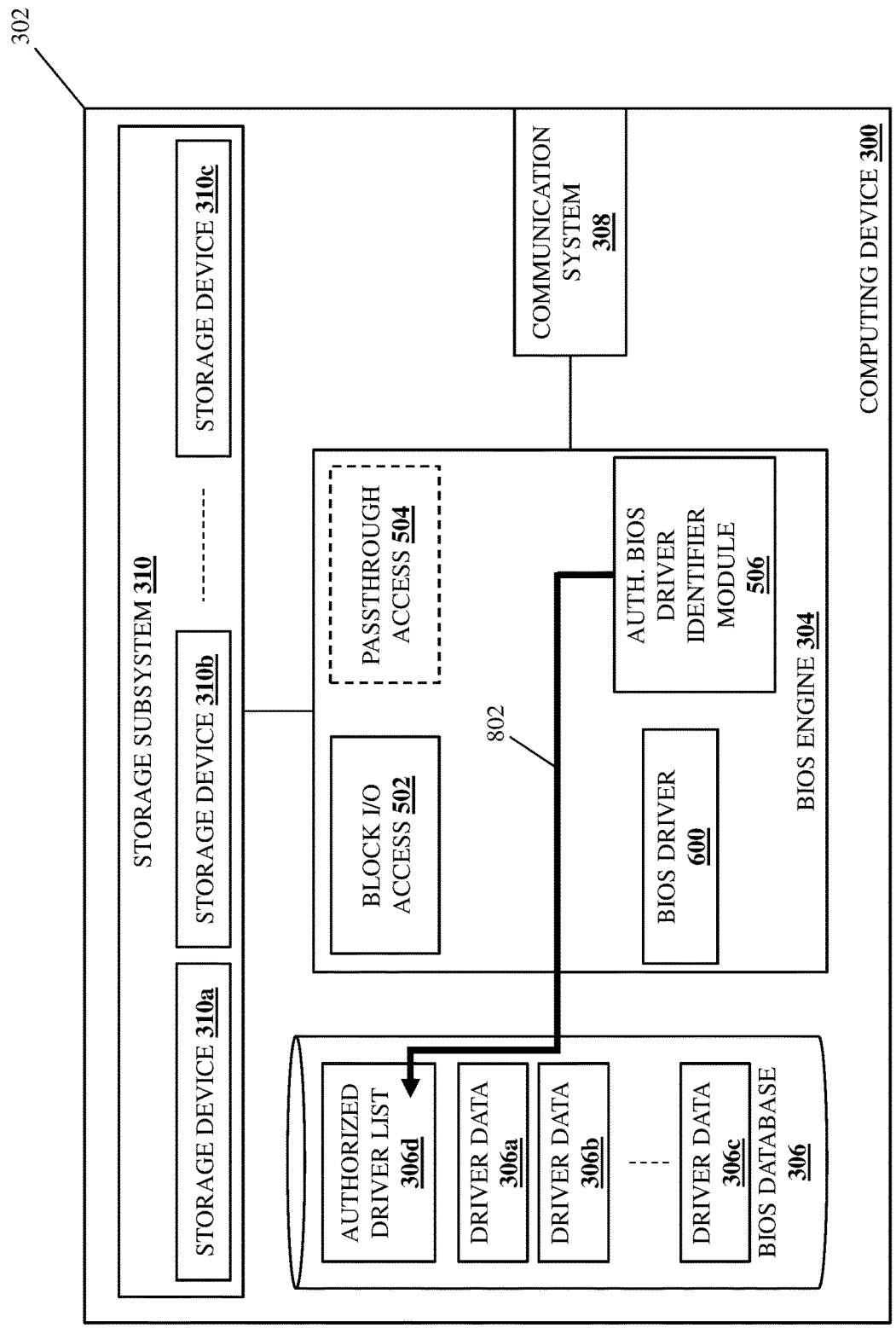
FIG. 8B is a schematic view illustrating an embodiment of the computing device of FIG. 3 operating during the method of FIG. 4.
Figure 9C:
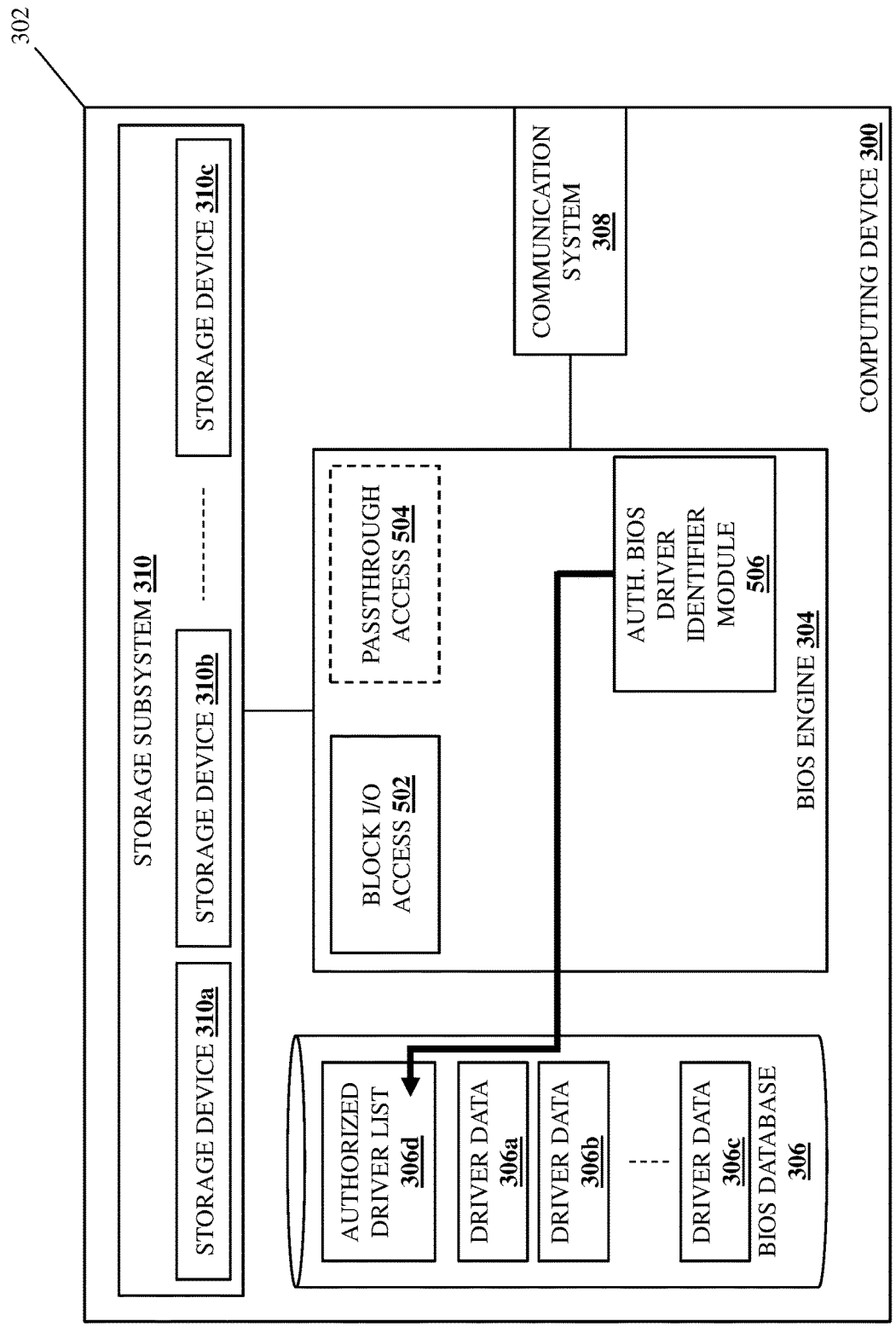
FIG. 9C is a schematic view illustrating an embodiment of the computing device of FIG. 3 operating during the method of FIG. 4.

The method 400 then proceeds to decision block 410 where it is determined whether the BIOS driver identifier is a secondary-access-authorized BIOS driver identifier. With reference to FIG. 8B, in an embodiment of decision block 410 in which local storage device secondary/passthrough access is being requested, the authenticated BIOS driver identifier module 506 may perform BIOS driver identifier authentication operations 802 that may include accessing the authorized driver list 306d included in the BIOS database 306 and determining whether the BIOS driver identifier for the BIOS driver that generated/transmitted the secondary access session start request is included on the authorized driver list 306d. With reference to FIGS. 9B and 9C, in an embodiment of decision block 410 in which network-attached storage device secondary/passthrough access is being requested, the authenticated BIOS driver identifier module 506 may perform BIOS driver identifier authentication operations 802 that may include accessing the authorized driver list 306d included in the BIOS database 306 and determining whether the BIOS driver identifier for the BIOS driver that generated/transmitted the secondary access session start request is included on the authorized driver list 306d.

In an embodiment, a computing device manufacturer of the computing device 300 may define one or more BIOS driver identifiers for BIOS drivers (e.g., by their Module Name String, by the hash value generated using that BIOS driver, etc.) that are authorized to utilize secondary/passthrough access to computing device components, and may provide those BIOS driver identifiers in the authorized driver list 306d. As such, some embodiments of the present disclosure allow a computing device manufacturer to authorize only their BIOS drivers to utilize secondary/passthrough access to computing device components. However, one of skill in the art in possession of the present disclosure will appreciate that other embodiments of the present disclosure may authorize BIOS drivers to utilize secondary/passthrough access to computing device components based on any of a variety of considerations while remaining within the scope of the present disclosure as well.

If, at decision block 406, it is determined that the BIOS driver identifier is not a secondary-access-authorized BIOS driver identifier, the method 400 proceeds to block 412 where the BIOS subsystem denies the secondary access session request. In an embodiment, at block 412 and in response to determining that the BIOS driver identifier for the BIOS driver that generated/transmitted the secondary access session start request is not included in the authorized driver list 306d, the authenticated BIOS driver identifier module 506 may deny the secondary access session start request. For example, at block 412, the authenticated BIOS driver identifier module 506 may prevent the BIOS driver that generated/transmitted the secondary access session start request from beginning a secondary access session start request, refuse to perform any secondary/passthrough operations in response to secondary/passthrough access commands transmitted by that BIOS driver, display information to a user of the computing device 300 that indicates that secondary/passthrough access for that BIOS driver has been denied (e.g., "EFI_ACCESS_DENIED"), and/or perform other secondary/passthrough access denial operations that would be apparent to one of skill in the art in possession of the present disclosure. The method 400 then returns to block 406. As such, the method 400 may loop such that the BIOS engine 304 receives secondary access session start requests from BIOS drivers, and denies those secondary access session start requests if a BIOS driver identifier identified for those BIOS drivers is not a secondary-access-authorized BIOS driver identifier.

Figure 8C:
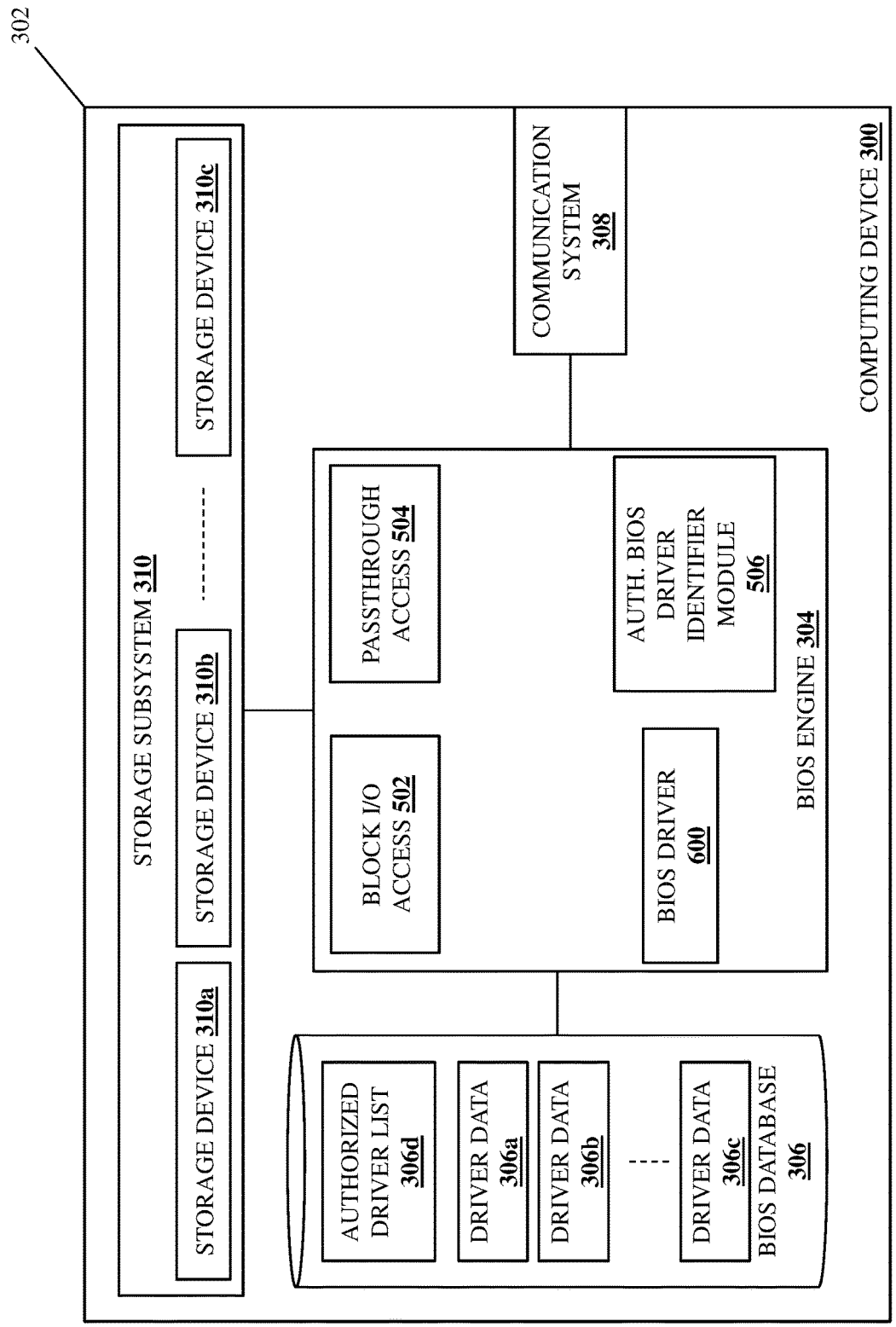
FIG. 8C is a schematic view illustrating an embodiment of the computing device of FIG. 3 operating during the method of FIG. 4.

If at decision block 406, it is determined that the BIOS driver identifier is a secondary-access-authorized BIOS driver identifier, the method 400 proceeds to block 414 where the BIOS subsystem begins a secondary access session. In an embodiment, at block 414 and in response to determining that the BIOS driver identifier for the BIOS driver that generated/transmitted the secondary access session start request is included in the authorized driver list 306d, the authenticated BIOS driver identifier module 506 may begin a secondary/passthrough access session for that BIOS driver. With reference to FIG. 8C, in an embodiment of block 414 in which local storage device secondary/passthrough access is being requested, the authenticated BIOS driver identifier module 506 will begin a secondary/passthrough access session with the BIOS driver 600 that generated/transmitted the secondary access session start request in which the BIOS engine 304 will perform secondary/passthrough operations on any or all of the storage devices 310a-310b in response to secondary/passthrough access commands from that BIOS driver 600 (as indicated by the passthrough access 504 being illustrated in solid lines in FIG. 8C).

Figure 9D:
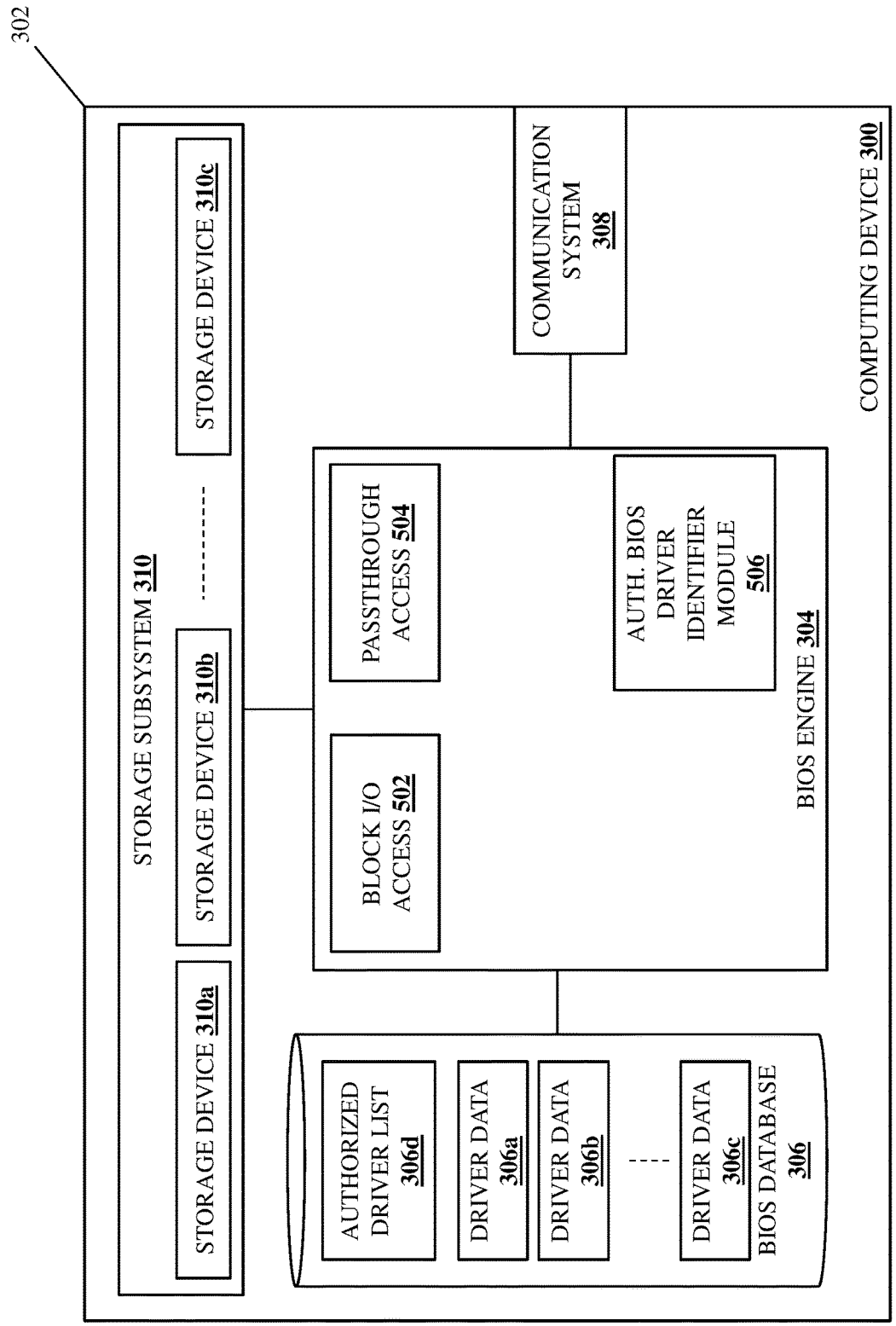
FIG. 9D is a schematic view illustrating an embodiment of the computing device of FIG. 3 operating during the method of FIG. 4.

With reference to FIG. 9D, in an embodiment of block 414 in which network-attached storage device secondary/passthrough access is being requested, the authenticated BIOS driver identifier module 506 will begin a secondary/passthrough access session with the BIOS driver that generated/transmitted the secondary access session start request in which the BIOS engine 304 will perform secondary/passthrough operations on any or all of the storage devices 310a-310b in response to secondary/passthrough access commands from that BIOS driver (as indicated by the secondary/passthrough access 504 being illustrated in solid lines in FIG. 9D). As will be appreciated by one of skill in the art in possession of the present disclosure, the UEFI is single-threaded, and thus the secondary/passthrough access session discussed above will allow the secondary/passthrough access 504 for a single BIOS driver, with that secondary/passthrough access 504 not accessible to other BIOS drivers until the secondary/passthrough access session is ended for the BIOS driver currently using it.

Figure 10:
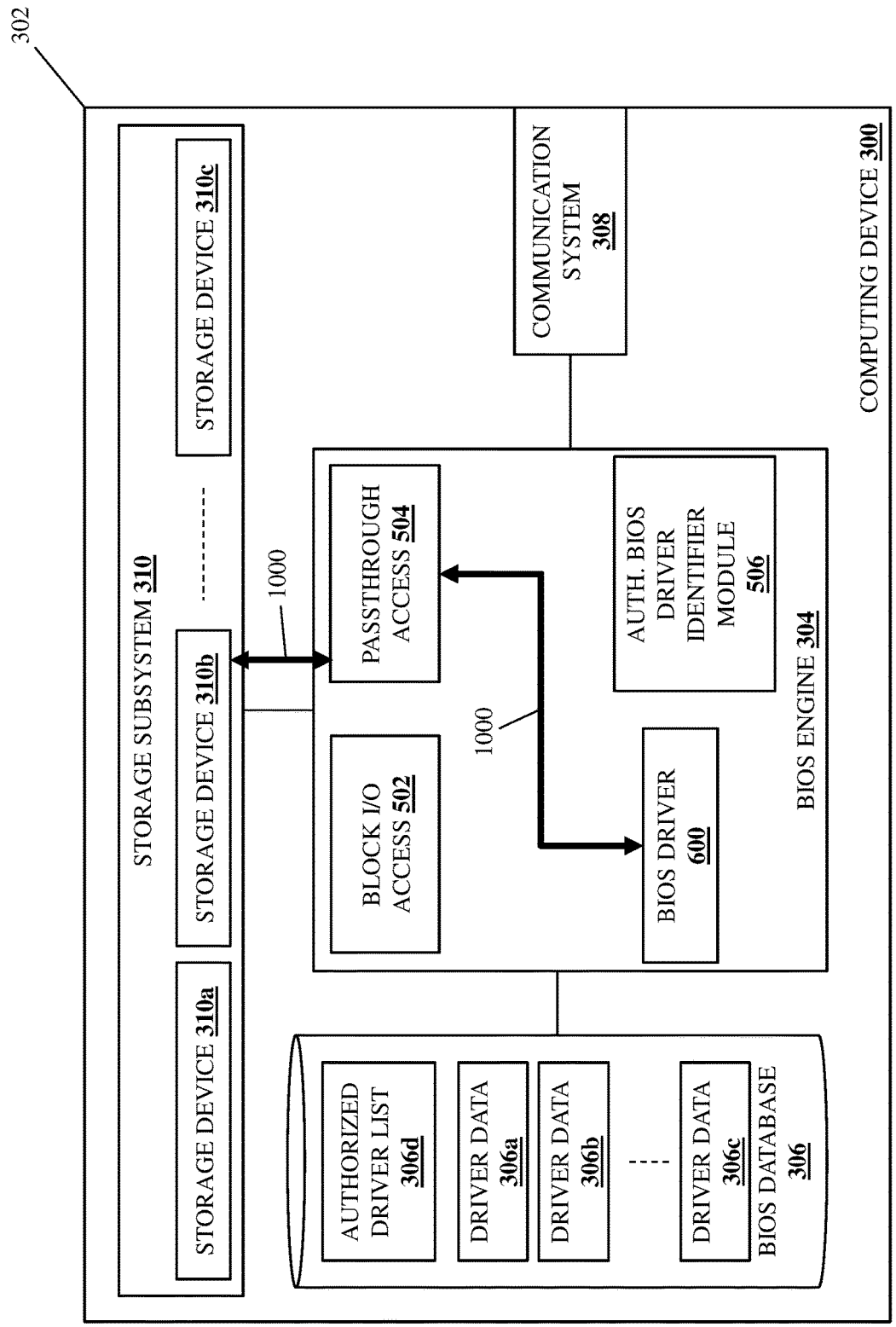
FIG. 10 is a schematic view illustrating an embodiment of the computing device of FIG. 3 operating during the method of FIG. 4.

The method 400 then proceeds to block 416 where the BIOS subsystem performs secondary access operation(s) on the computing device component in response to secondary access command(s) from the BIOS driver. With reference to FIG. 10, in an embodiment of block 416 in which local storage device secondary/passthrough access was granted, the BIOS driver 600 may perform secondary/passthrough access operation 1000 that may include the BIOS driver 600 using the secondary/passthrough protocol(s) discussed above to generate and transmit secondary/passthrough access commands to the BIOS engine 202a/304, and the BIOS engine 202a/304 performing secondary/passthrough operations on the storage device 204b/310b based on those secondary/passthrough access commands (and in some cases in response to verifying that the BIOS driver 600 is part of the secondary/passthrough access session).

Figure 11A:
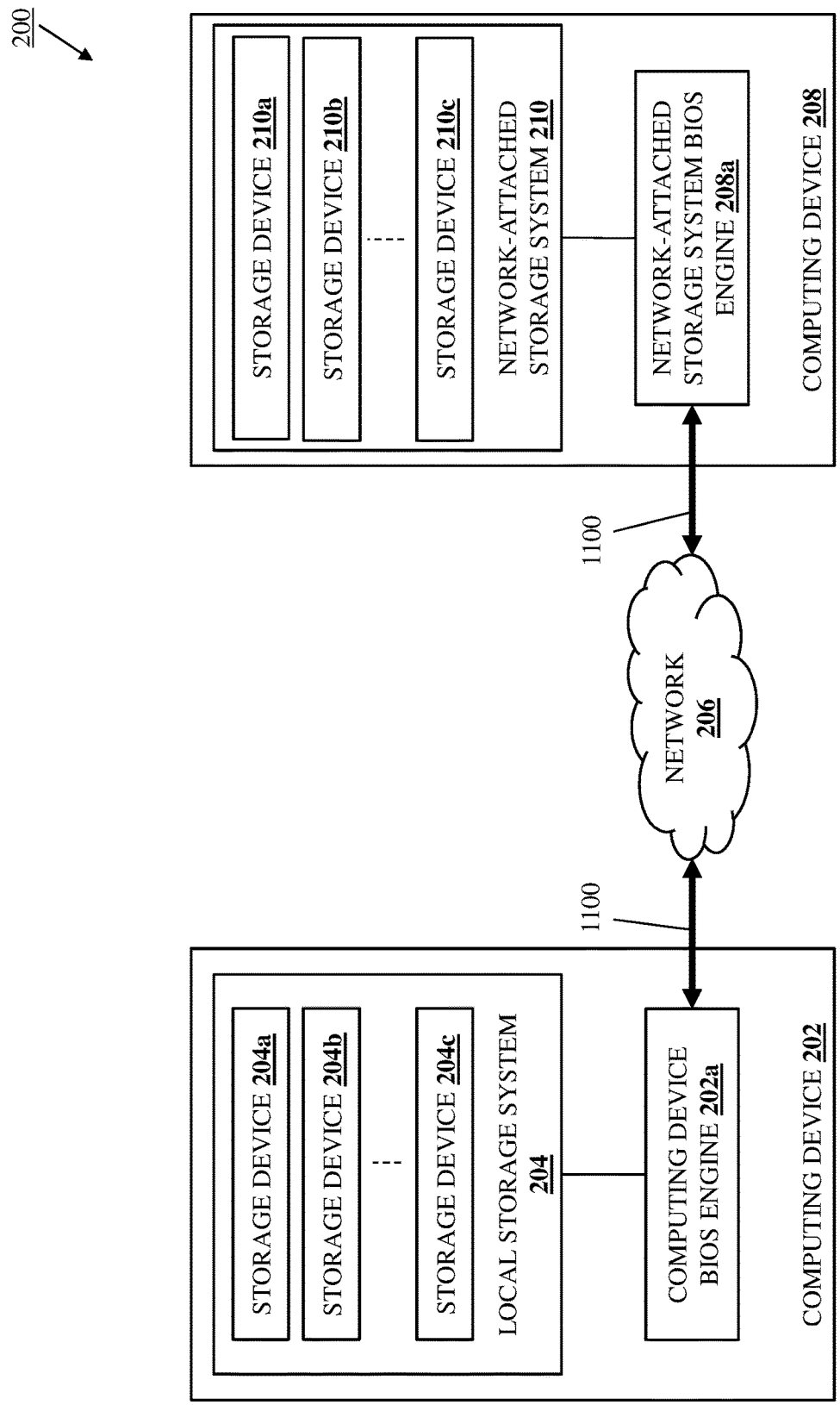
FIG. 11A is a schematic view illustrating an embodiment of the networked system of FIG. 2 operating during the method of FIG. 4.
Figure 11B:
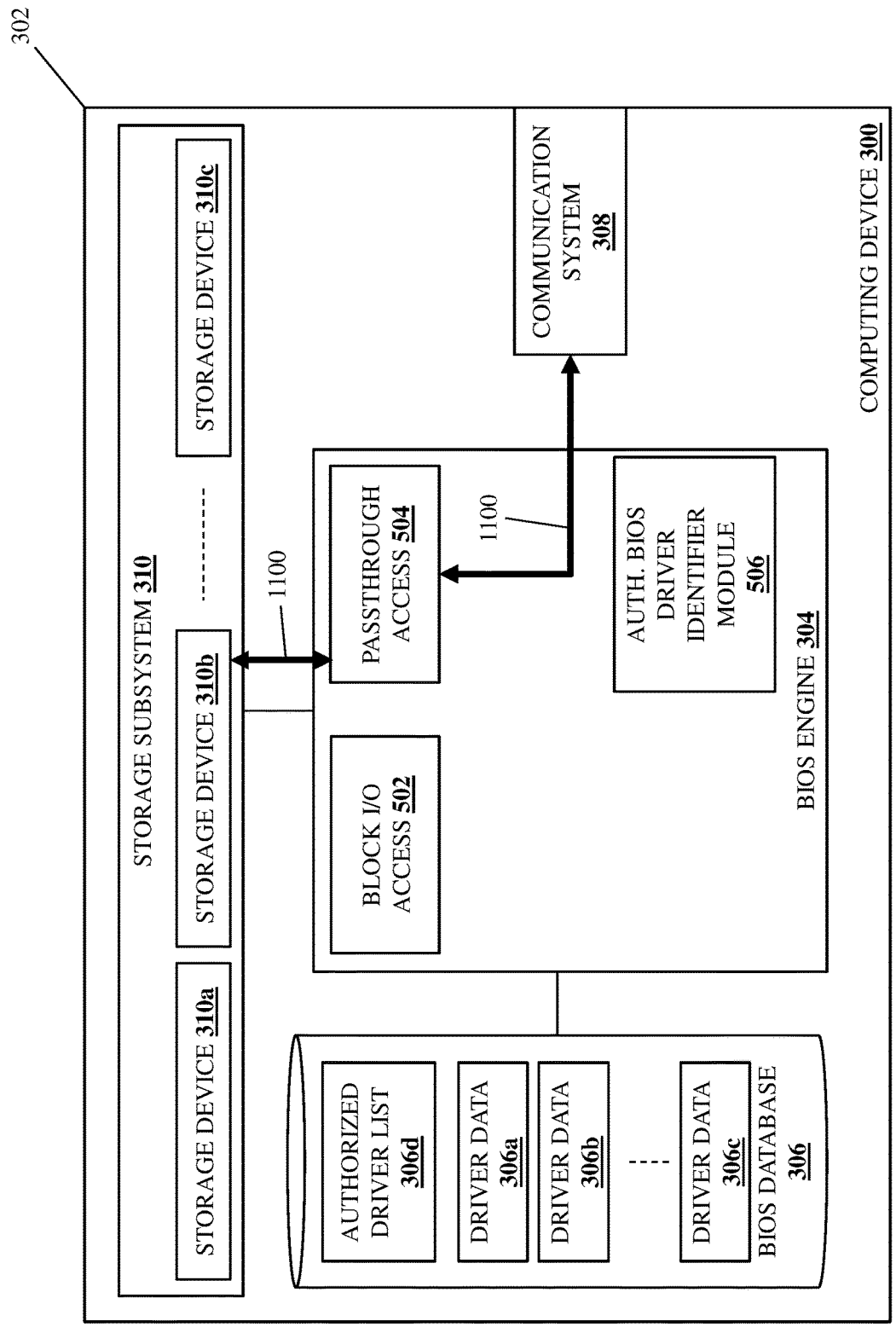
FIG. 11B is a schematic view illustrating an embodiment of the computing device of FIG. 3 operating during the method of FIG. 4.

With reference to FIGS. 11A and 11B, in an embodiment of block 416 in which network-attached storage device secondary/passthrough access was granted, the BIOS driver (similar to the BIOS driver 600 discussed above) in the computing device 202/300 may perform secondary/passthrough access operation 1100 that may include the BIOS driver using the secondary/passthrough protocol(s) discussed above to generate and transmit secondary/passthrough access commands via the network 206 (using the communication systems 308 in the computing devices 202/300 and 208/300) to the BIOS engine 208a/304, and the BIOS engine 208a/304 performing secondary/passthrough operations on the storage device 210b/310b based on those secondary/passthrough access commands (and in some cases in response to verifying that the BIOS driver is part of the secondary/passthrough access session). As will be appreciated by one of skill in the art in possession of the present disclosure, the secondary/passthrough access commands and operations may provide for the creation and/or deletion of namespaces, administrator commands/operations, security commands/operations, and/or other relatively "low-level" commands/operations known in the art.

The method 400 then proceeds to decision block 418 where it is determined whether a secondary access session end request has been received. In the embodiments discussed below, the authenticated BIOS driver identifier module 506 is configured to maintain the secondary/passthrough access session with the BIOS driver until the BIOS driver requests to end that secondary/passthrough access session. As such, at decision block 418, the authenticated BIOS driver identifier module 506 may monitor for a secondary access session end request from the BIOS driver. However, in other embodiments, the secondary/passthrough access session with the BIOS driver may be subject to time limits, inactivity limits, and/or other limits that would be apparent to one of skill in the art in possession of the present disclosure, and thus at decision block 418 the authenticated BIOS driver identifier module 506 may monitor to determine whether the secondary/passthrough access session has been open for a time period associated with the time limit, whether the BIS driver has not transmitted a secondary/passthrough access command for a time period associated with the inactivity limit, and/or whether any other limit has been reached. If, at decision block 418, it is determined that a secondary access session end request has not been received, the method 400 returns to block 416. As such, the method 400 may loop such that the BIOS engine 304 receives secondary/passthrough access commands and performs corresponding secondary/passthrough operations for the BIOS driver during its secondary/passthrough access session as long as no secondary access session end request has been received (or no time limit, inactivity limit, or other limit has been reached).

Figure 12:
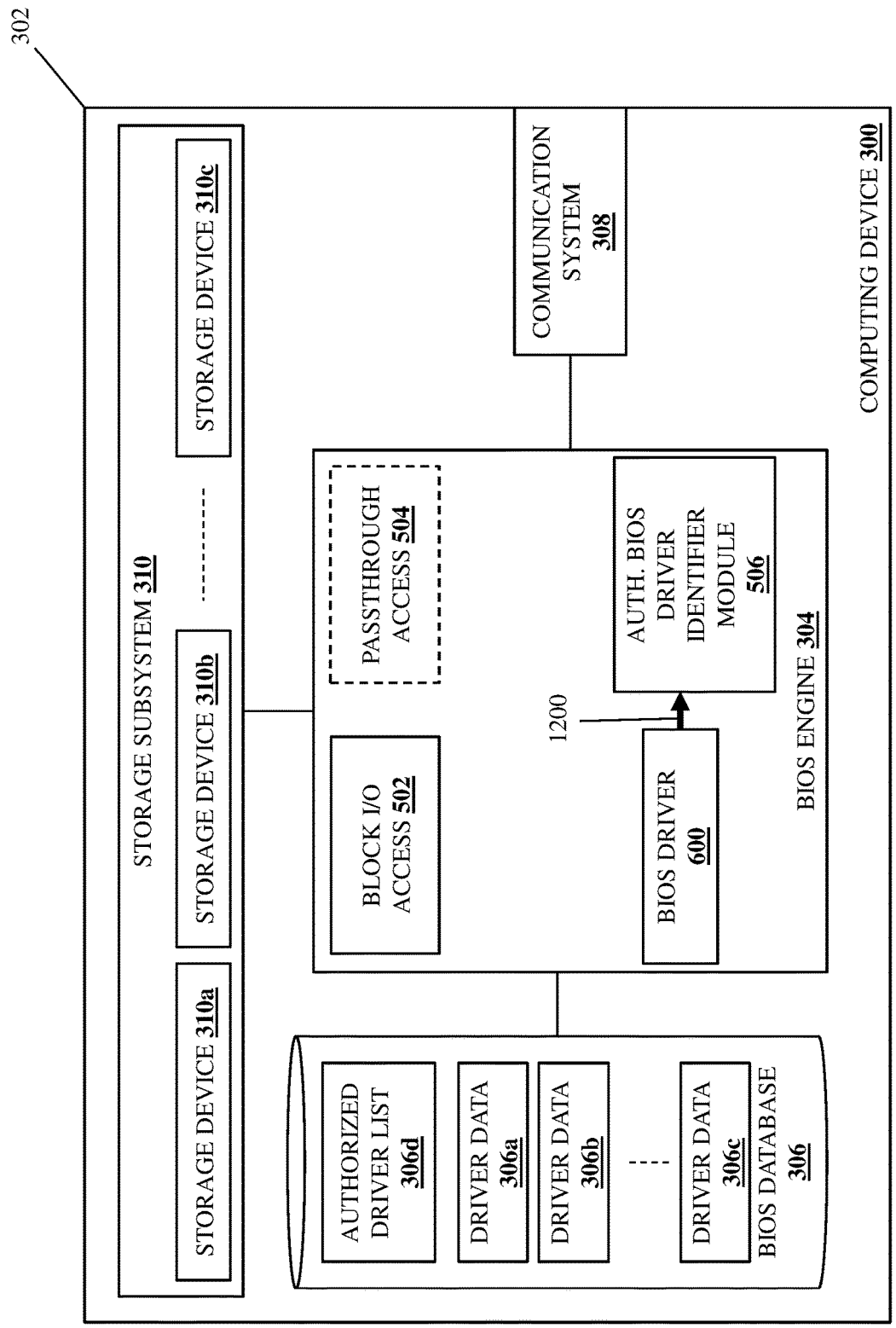
FIG. 12 is a schematic view illustrating an embodiment of the computing device of FIG. 3 operating during the method of FIG. 4.

If, at decision block 418, it is determined that a secondary access session end request has been received, the method 400 proceeds to block 420 where the BIOS subsystem ends the secondary access session. With reference to FIG. 12, in an embodiment of decision block 418 in which local storage device secondary/passthrough access was granted, the BIOS driver 600 provided by the BIOS engine 202*a*/304 of the computing device 202/300 may perform secondary access session end request operations 1200 that include using the secondary/passthrough access authentication protocol(s) (e.g., an "StopAuthenticatedSession" API) to generate and transmit a secondary access session end request to the authenticated BIOS driver identifier module 506 in the BIOS engine 202*a*/304 of the computing device 202/300. In response, at block 420 the authenticated BIOS driver identifier module 506 may end the secondary/passthrough access session with the BIOS driver 600, and will no longer perform any secondary/passthrough operations in response to secondary/passthrough access commands from the BIOS driver 600 (as illustrated by the dashed lines used for the passthrough access 504 in FIG. 12) without the establishment of a new secondary/passthrough access session (i.e., "EFI_ACCESS_DENIED" will be returned for any secondary passthrough command received by the BIOS engine 202*a*/304).

Figure 13A:
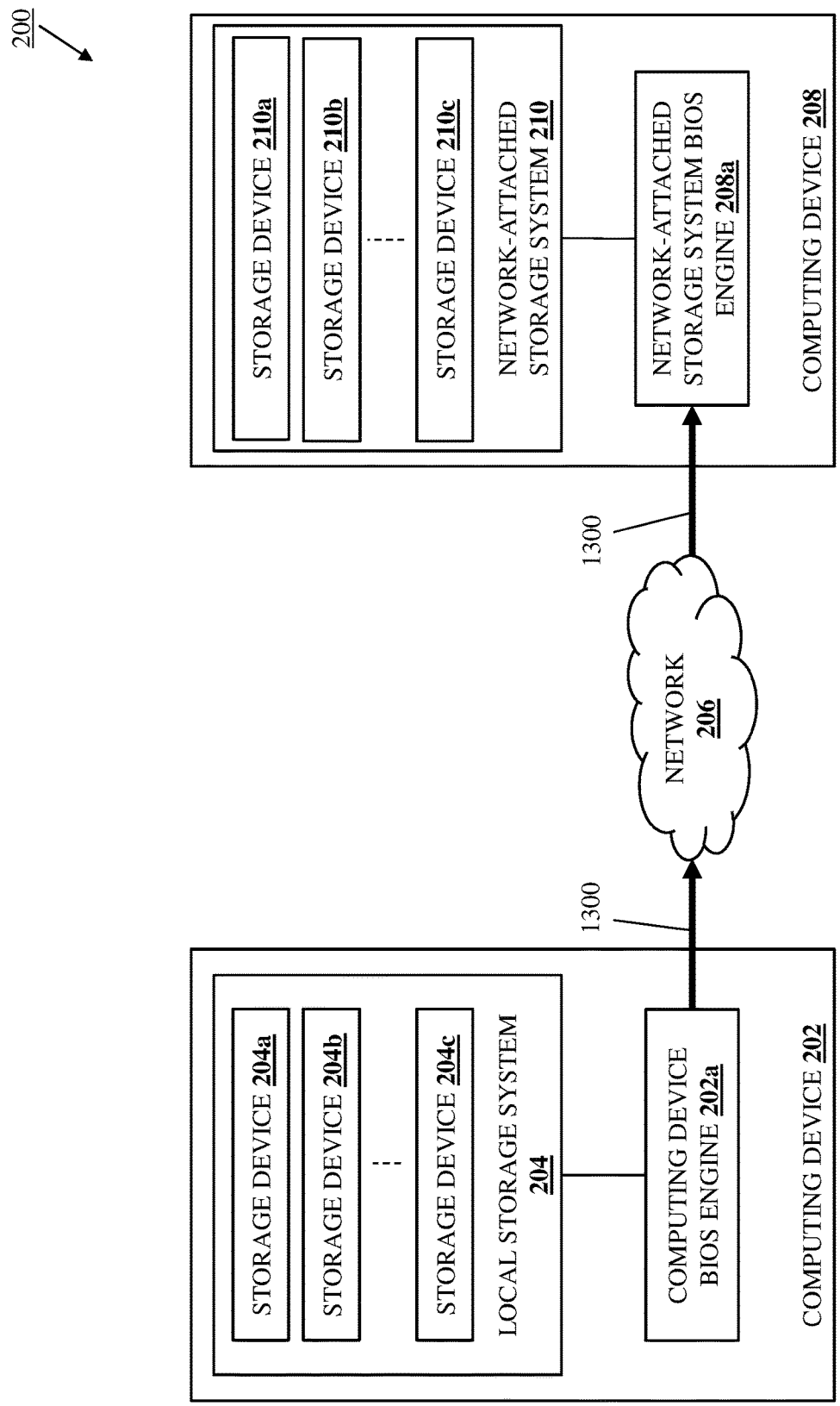
FIG. 13A is a schematic view illustrating an embodiment of the networked system of FIG. 2 operating during the method of FIG. 4.
Figure 13B:
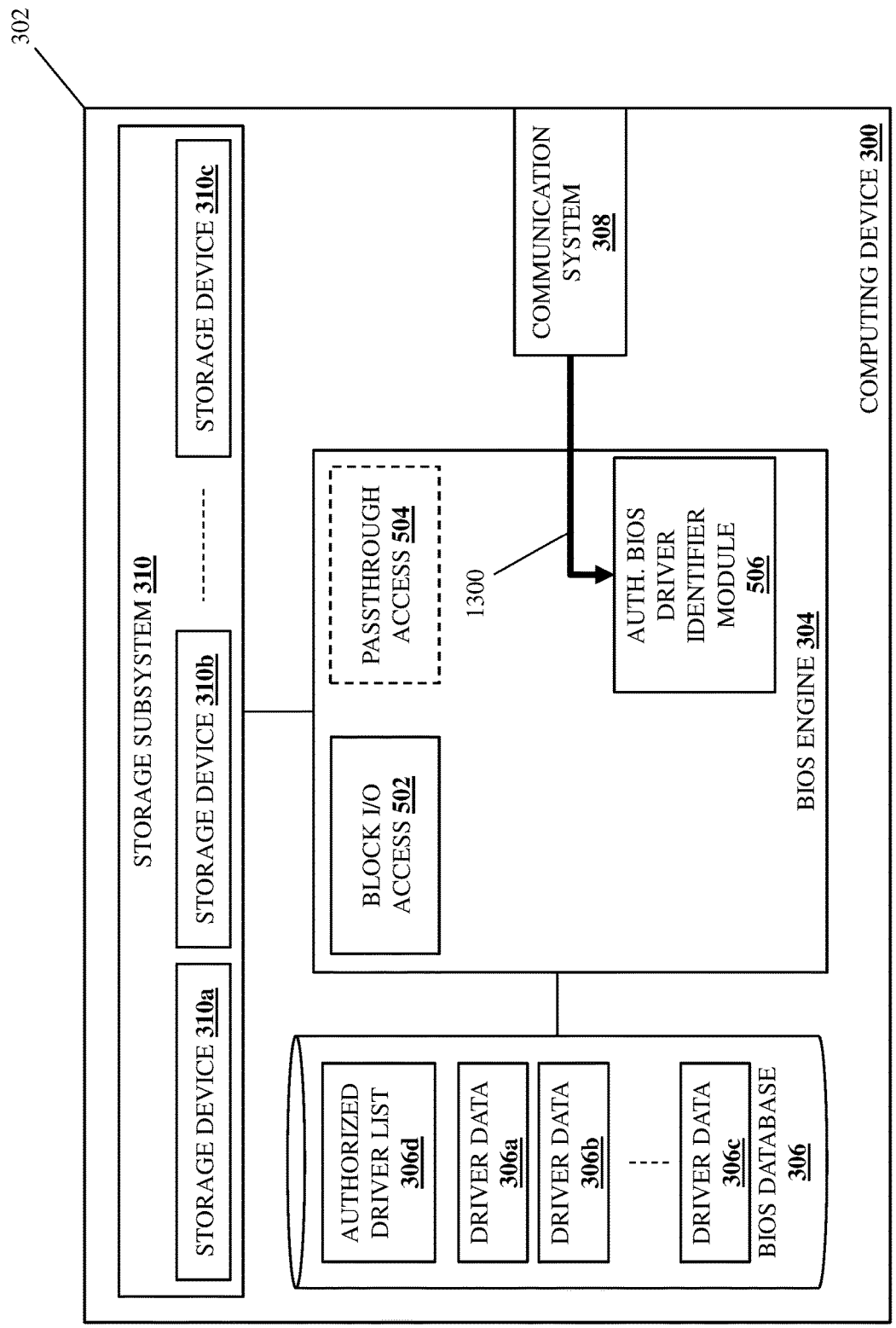
FIG. 13B is a schematic view illustrating an embodiment of the computing device of FIG. 3 operating during the method of FIG. 4.

With reference to FIGS. 13A and 13B, in an embodiment of block 418 in which network-attached storage device secondary/passthrough access was granted, the BIOS driver (e.g., similar to the BIOS driver 600 discussed above with reference to FIG. 12) provided by the BIOS engine 202*a*/304 of the computing device 202/300 may perform secondary access session end request operations 1300 that include using the secondary/passthrough access authentication protocol(s) (e.g., an "StopAuthenticatedSession" API) to generate and transmit a secondary access session end request via the network 206 (using the communication systems 308 in the computing devices 202/300 and 208/300) to the authenticated BIOS driver identifier module 506 in the BIOS engine 208*a*/304 of the computing device 208/300. In response, at block 420 the authenticated BIOS driver identifier module 506 may end the secondary/passthrough access session with the BIOS driver, and will no longer perform any secondary/passthrough operations in response to secondary/passthrough access commands from the BIOS driver (as illustrated by the dashed lines used for the passthrough access 504 in FIG. 13B) without the establishment of a new secondary/passthrough access session (i.e., "EFI_ACCESS_DENIED" will be returned for any secondary passthrough command received by the BIOS engine 208*a*/304).

The method 400 then returns to block 402. As such, the method 400 may loop such that the BIOS engine 304 receives secondary access session start requests from BIOS drivers, grants those secondary access session start requests if a BIOS driver identifier identified for those BIOS drivers is a secondary-access-authorized BIOS driver identifier, performs secondary/passthrough operations in response to secondary/passthrough access commands from those BIOS drivers during their secondary/passthrough access sessions, and ends those secondary/passthrough access sessions when requested by those BIOS drivers.

Thus, systems and methods have been described that provide for the secure use of passthrough access to NVMe and NVMe-oF storage devices via the identification of BIOS drivers that request such passthrough access, and only granting that passthrough access to BIOS drivers that are authorized for that passthrough access. For example, the secure BIOS passthrough system of the present disclosure may include a server device having an NVMe or NVMe-oF storage device, and a BIOS subsystem in the server device that is coupled to the NVMe or NVMe-oF storage device. The BIOS subsystem enables block I/O access to the NVMe or NVMe-oF storage device to BIOS drivers. When the BIOS subsystem receives a passthrough access session start request from a first BIOS driver to start a passthrough access session to use passthrough access to the NVMe or NVMe-oF storage device, it retrieves a first BIOS driver identifier for the first BIOS driver based on the passthrough access session start request, determines that the first BIOS driver identifier is a passthrough-access-authorized BIOS driver identifier and, in response, begins the first passthrough access session and may perform passthrough access operation(s) on the NVMe or NVMe-oF storage device in response to receiving passthrough access command(s) from the first BIOS driver during the passthrough access session. As such, passthrough access that allows the performance of administrator commands, security commands, and/or other relatively "low-level"/passthrough access commands on NVMe or NVMe-oF storage devices is secured.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A secure Basic Input/Output System (BIOS)-enabled passthrough system, comprising:
   a computing device;
   a computing device component that is included in the computing device; and
   a BIOS subsystem that is included in the computing device and that is coupled to the computing device component, wherein the BIOS subsystem is configured to:
   enable, to a plurality of BIOS drivers, primary access to the computing device component;

receive, from a first BIOS driver included in the plurality of BIOS drivers, a first secondary access session start request to start a first secondary access session to use secondary access to the computing device component;

retrieve, based on the first secondary access session start request, a first BIOS driver identifier for the first BIOS driver;

determine that the first BIOS driver identifier is a secondary-access-authorized BIOS driver identifier;

begin, in response to determining that the first BIOS driver identifier is a secondary-access-authorized BIOS driver identifier, the first secondary access session; and perform, in response to receiving at least one secondary access command from the first BIOS driver during the first secondary access session, at least one secondary access operation on the computing device component.

2. The system of claim 1, wherein the computing device component is a Non-Volatile Memory express (NVMe) storage device, the primary access is block Input/Output (I/O) access, and the secondary access is passthrough access.

3. The system of claim 1, wherein the BIOS subsystem is configured to:

provide at least one secondary access protocol to the plurality of BIOS drivers prior to receiving the request, wherein the at least one secondary access protocol allows each of the plurality of BIOS drivers to generate secondary access commands.

4. The system of claim 1, wherein the BIOS subsystem is configured to:

receive, from the first BIOS driver during the first secondary access session, a secondary access session end request to end the first secondary access session; and end, in response to receiving the secondary access session end request, the first secondary access session, wherein the BIOS subsystem is configured to deny secondary access commands received from the first BIOS driver after the first secondary access session is ended.

5. The system of claim 1, wherein the BIOS subsystem is configured to:

receive, from a second BIOS driver included in the plurality of BIOS drivers, a second secondary access session start request to start a second secondary access session to use the secondary access to the computing device component;

retrieve, based on the second secondary access session start request, a second BIOS driver identifier for the second BIOS driver;

determine that the second BIOS driver identifier is not a secondary-access-authorized BIOS driver identifier; and deny, in response to determining that the second BIOS driver identifier is not a secondary-access-authorized BIOS driver identifier, the second secondary access session such that secondary access operations are not performed on the computing device component in response to secondary access commands received from the second BIOS driver.

6. The system of claim 1, wherein the retrieving the first BIOS driver identifier for the first BIOS driver based on the first secondary access session start request includes:

identifying an instruction pointer in a call stack associated with the first secondary access session request;

determining, using the instruction pointer, a memory location associated with the first BIOS driver; and searching, based on the memory location, a memory system for the first BIOS driver identifier.

7. An Information Handling System (IHS), comprising:

a processing system; and a memory system that is coupled to the processing system and that includes instructions that, when executed by the processing system, cause the processing system to provide a Basic Input/Output System (BIOS) engine that is configured to:

enable, to a plurality of BIOS drivers, primary access to a computing device component;

receive, from a first BIOS driver included in the plurality of BIOS drivers, a first secondary access session start request to start a first secondary access session to use secondary access to the computing device component;

retrieve, based on the first secondary access session start request, a first BIOS driver identifier for the first BIOS driver;

determine that the first BIOS driver identifier is a secondary-access-authorized BIOS driver identifier;

begin, in response to determining that the first BIOS driver identifier is a secondary-access-authorized BIOS driver identifier, the first secondary access session; and perform, in response to receiving at least one secondary access command from the first BIOS driver during the first secondary access session, at least one secondary access operation on the computing device component.

8. The IHS of claim 7, wherein the computing device component is a Non-Volatile Memory express (NVMe) storage device, the primary access is block Input/Output (I/O) access, and the secondary access is passthrough access.

9. The IHS of claim 7, wherein the BIOS engine is configured to:

provide at least one secondary access protocol to the plurality of BIOS drivers prior to receiving the request, wherein the at least one secondary access protocol allows each of the plurality of BIOS drivers to generate secondary access commands.

10. The IHS of claim 7, wherein the BIOS engine is configured to:

receive, from the first BIOS driver during the first secondary access session, a secondary access session end request to end the first secondary access session; and end, in response to receiving the secondary access session end request, the first secondary access session, wherein the BIOS subsystem is configured to deny secondary access commands received from the first BIOS driver after the first secondary access session is ended.

11. The IHS of claim 7, wherein the BIOS engine is configured to:

receive, from a second BIOS driver included in the plurality of BIOS drivers, a second secondary access session start request to start a second secondary access session to use the secondary access to the computing device component;

retrieve, based on the second secondary access session start request, a second BIOS driver identifier for the second BIOS driver;

determine that the second BIOS driver identifier is not a secondary-access-authorized BIOS driver identifier; and deny, in response to determining that the second BIOS driver identifier is not a secondary-access-authorized BIOS driver identifier, the second secondary access session such that secondary access operations are not performed on the computing device component in response to secondary access commands received from the second BIOS driver.

12. The IHS of claim 7, wherein the retrieving the first BIOS driver identifier for the first BIOS driver based on the first secondary access session start request includes:
identifying an instruction pointer in a call stack associated with the first secondary access session request;
determining, using the instruction pointer, a memory location associated with the first BIOS driver; and
searching, based on the memory location, a memory system for the first BIOS driver identifier.

13. The IHS of claim 12, wherein the searching the memory system for the first BIOS driver identifier based on the memory location includes:
identifying a memory system alignment point in the memory system adjacent the memory location;
identifying a BIOS driver signature adjacent the memory system alignment point; and
identifying the first BIOS driver identifier adjacent the BIOS driver signature.

14. A method for providing secure BIOS-enabled pass-through access, comprising:
enabling, by a BIOS subsystem to a plurality of BIOS drivers, primary access to a computing device component;
receiving, by the BIOS subsystem from a first BIOS driver included in the plurality of BIOS drivers, a first secondary access session start request to start a first secondary access session to use secondary access to the computing device component;
retrieving, by the BIOS subsystem based on the first secondary access session start request, a first BIOS driver identifier for the first BIOS driver;
determining, by the BIOS subsystem, that the first BIOS driver identifier is a secondary-access-authorized BIOS driver identifier;
beginning, by the BIOS subsystem in response to determining that the first BIOS driver identifier is a secondary-access-authorized BIOS driver identifier, the first secondary access session; and
performing, by the BIOS subsystem in response to receiving at least one secondary access command from the first BIOS driver during the first secondary access session, at least one secondary access operation on the computing device component.

15. The method of claim 14, wherein the computing device component is a Non-Volatile Memory express (NVMe) storage device, the primary access is block Input/Output (I/O) access, and the secondary access is passthrough access.

16. The method of claim 14, further comprising:
providing, by the BIOS subsystem, at least one secondary access protocol to the plurality of BIOS drivers prior to receiving the request, wherein the at least one secondary access protocol allows each of the plurality of BIOS drivers to generate secondary access commands.

17. The method of claim 14, further comprising:
receiving, by the BIOS subsystem from the first BIOS driver during the first secondary access session, a secondary access session end request to end the first secondary access session; and
ending, by the BIOS subsystem in response to receiving the secondary access session end request, the first secondary access session, wherein the BIOS subsystem is configured to deny secondary access commands received from the first BIOS driver after the first secondary access session is ended.

18. The method of claim 14, further comprising:
receiving, by the BIOS subsystem from a second BIOS driver included in the plurality of BIOS drivers, a second secondary access session start request to start a second secondary access session to use the secondary access to the computing device component;
retrieving, by the BIOS subsystem based on the second secondary access session start request, a second BIOS driver identifier for the second BIOS driver;
determining, by the BIOS subsystem, that the second BIOS driver identifier is not a secondary-access-authorized BIOS driver identifier; and
denying, by the BIOS subsystem in response to determining that the second BIOS driver identifier is not a secondary-access-authorized BIOS driver identifier, the second secondary access session such that secondary access operations are not performed on the computing device component in response to secondary access commands received from the second BIOS driver.

19. The method of claim 14, wherein the retrieving the first BIOS driver identifier for the first BIOS driver based on the first secondary access session start request includes:
identifying, by the BIOS subsystem, an instruction pointer in a call stack associated with the first secondary access session request;
determining, by the BIOS subsystem using the instruction pointer, a memory location associated with the first BIOS driver; and
searching, by the BIOS subsystem based on the memory location, a memory system for the first BIOS driver identifier.

20. The method of claim 19, wherein the searching the memory system for the first BIOS driver identifier based on the memory location includes:
identifying, by the BIOS subsystem, a memory system alignment point in the memory system adjacent the memory location;
identifying, by the BIOS subsystem, a BIOS driver signature adjacent the memory system alignment point; and
identifying, by the BIOS subsystem, the first BIOS driver identifier adjacent the BIOS driver signature.

* * * * *